United States Patent
Pedersen et al.

(10) Patent No.: US 9,645,580 B2
(45) Date of Patent: *May 9, 2017

(54) RADIO-CONTROLLED FLYING CRAFT

(71) Applicant: QFO Labs, Inc., Bloomington, MN (US)

(72) Inventors: Brad Pedersen, Minneapolis, MN (US); Peter Spirov, Saint Joseph, MI (US)

(73) Assignee: QFO Labs, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,414

(22) Filed: Sep. 21, 2016

(65) Prior Publication Data

US 2017/0010622 A1    Jan. 12, 2017

Related U.S. Application Data

(60) Division of application No. 14/791,253, filed on Jul. 3, 2015, which is a division of application No.
(Continued)

(51) Int. Cl.
*G05D 1/08* (2006.01)
*B60V 1/06* (2006.01)
(Continued)

(52) U.S. Cl.
CPC ............. *G05D 1/0816* (2013.01); *B60V 1/06* (2013.01); *B60V 1/10* (2013.01); *B64C 15/02* (2013.01);
(Continued)

(58) Field of Classification Search
CPC .. G05D 1/0016; G05D 1/0022; G05D 1/0816; G05D 1/0858; B64C 27/08; B64C 27/24; B64C 39/0024
See application file for complete search history.

(56) References Cited

U.S. PATENT DOCUMENTS 129,401  A    7/1872   Forbes
129,402  A    7/1872   Goodrum
(Continued)

FOREIGN PATENT DOCUMENTS

FR         2789765         8/2000

OTHER PUBLICATIONS

Frazzoli, et al., "Real-time motion planning for agile autonomous vehicles", "Journal of Guidance, Control, and Dynamics", Jan.-Feb. 2002, pp. 116-129, vol. 25, No. 1.
(Continued)

*Primary Examiner* — Thomas G Black
*Assistant Examiner* — Peter D Nolan
(74) *Attorney, Agent, or Firm* — Charles A. Lemaire; Jonathan M. Rixen; Lemaire Patent Law Firm, P.L.L.C.

(57) ABSTRACT

A homeostatic flying hovercraft preferably utilizes at least two pairs of counter-rotating ducted fans to generate lift like a hovercraft and utilizes a homeostatic hover control system to create a flying craft that is easily controlled. The homeostatic hover control system provides true homeostasis of the craft with a true fly-by-wire flight control and control-by-wire system control.

17 Claims, 42 Drawing Sheets

Related U.S. Application Data

13/092,940, filed on Apr. 23, 2011, now Pat. No. 9,073,532, which is a continuation of application No. 11/838,040, filed on Aug. 13, 2007, now Pat. No. 7,931,239, which is a division of application No. 10/526,153, filed as application No. PCT/US03/27415 on Sep. 2, 2003, now abandoned.

(60) Provisional application No. 60/407,444, filed on Aug. 30, 2002.

(51) Int. Cl.
| | |
|---|---|
| B60V 1/10 | (2006.01) |
| B64C 27/20 | (2006.01) |
| B64C 39/00 | (2006.01) |
| B64C 39/02 | (2006.01) |
| G05D 1/00 | (2006.01) |
| B64C 15/02 | (2006.01) |
| B64C 27/08 | (2006.01) |
| B64D 27/24 | (2006.01) |

(52) U.S. Cl.
CPC ............ *B64C 27/08* (2013.01); *B64C 27/20* (2013.01); *B64C 39/001* (2013.01); *B64C 39/024* (2013.01); *B64D 27/24* (2013.01); *G05D 1/0016* (2013.01); *G05D 1/0022* (2013.01); *G05D 1/0858* (2013.01); *B64C 2201/042* (2013.01); *B64C 2201/10* (2013.01); *B64C 2201/108* (2013.01); *B64C 2201/146* (2013.01)

(56) References Cited

U.S. PATENT DOCUMENTS

| | | |
|---|---|---|
| 613,809 A | 11/1898 | Tesla |
| 730,097 A | 6/1903 | Crawford et al. |
| 905,547 A | 12/1908 | Macduff |
| 931,966 A | 8/1909 | Sinclair |
| 996,627 A | 7/1911 | Eggert |
| 1,012,631 A | 12/1911 | Gridley |
| 1,291,345 A | 1/1919 | Zimdars |
| 1,405,035 A | 1/1922 | Hunt |
| 1,816,707 A | 7/1931 | Wardell |
| 1,911,041 A | 7/1933 | Smyser |
| 1,959,270 A | 5/1934 | Hedloff |
| 2,077,471 A | 4/1937 | Fink |
| 2,461,435 A | 2/1949 | Neumann et al. |
| 2,567,392 A | 9/1951 | Naught |
| 2,728,537 A | 12/1955 | Elkins |
| 2,730,311 A | 1/1956 | Doak |
| 2,863,261 A | 12/1958 | Mead |
| 2,876,965 A | 3/1959 | Streib |
| 2,949,693 A | 8/1960 | McRoskey |
| 2,953,321 A | 9/1960 | Robertson et al. |
| 2,968,318 A | 1/1961 | Bauman |
| 2,968,453 A | 1/1961 | Bright |
| 2,988,301 A | 6/1961 | Fletcher |
| 3,002,709 A | 10/1961 | Cochran |
| 3,053,480 A | 9/1962 | Vanderlip |
| 3,199,809 A | 8/1965 | Modesti |
| 3,394,906 A | 7/1968 | Rogers |
| 3,395,876 A | 8/1968 | Green |
| 3,402,488 A | 9/1968 | Leavitt |
| 3,442,469 A | 5/1969 | Davis |
| 3,477,168 A | 11/1969 | Trodglen, Jr. |
| 3,503,573 A | 3/1970 | Modesti |
| 3,508,360 A | 4/1970 | Williams |
| 3,528,284 A | 9/1970 | Skoglund et al. |
| 3,557,304 A | 1/1971 | Hansen et al. |
| 3,568,358 A | 3/1971 | Bruce |
| 3,608,033 A | 9/1971 | Hall |
| 3,677,503 A | 7/1972 | Freemen, Jr. |
| 3,752,417 A | 8/1973 | Lagace |
| 3,933,325 A | 1/1976 | Kaelin |
| 3,946,970 A | 3/1976 | Blankenship |
| 4,065,873 A | 1/1978 | Jones |
| 4,161,843 A | 7/1979 | Hui |
| 4,196,877 A | 4/1980 | Mutrux |
| 4,214,720 A | 7/1980 | De Sautel |
| 4,273,302 A | 6/1981 | Jordan |
| 4,386,748 A | 6/1983 | Jordan |
| 4,457,476 A | 7/1984 | Andresevitz |
| 4,461,436 A | 7/1984 | Messina |
| 4,566,699 A | 1/1986 | Cucuzza |
| D292,194 S | 10/1987 | Moller |
| 4,778,128 A | 10/1988 | Wright et al. |
| 4,795,111 A | 1/1989 | Moller |
| 4,796,836 A | 1/1989 | Buchelt |
| 4,804,156 A | 2/1989 | Harmon |
| 4,880,071 A | 11/1989 | Tracy |
| 4,955,962 A | 9/1990 | Mell |
| 5,035,377 A | 7/1991 | Buchelt |
| 5,043,646 A | 8/1991 | Smith et al. |
| 5,049,031 A | 9/1991 | Mintenko et al. |
| 5,064,143 A | 11/1991 | Bucher |
| 5,067,674 A | 11/1991 | Heyche et al. |
| 5,071,383 A | 12/1991 | Kinoshita |
| 5,072,892 A | 12/1991 | Carrington |
| 5,082,079 A | 1/1992 | Lissaman et al. |
| 5,128,671 A * | 7/1992 | Thomas, Jr. ............ A63F 13/06 244/191 |
| 5,150,857 A | 9/1992 | Moffitt et al. |
| 5,152,478 A | 10/1992 | Cycon et al. |
| 5,178,344 A | 1/1993 | Dlouhy |
| 5,203,521 A | 4/1993 | Day |
| 5,213,284 A | 5/1993 | Webster |
| 5,240,207 A | 8/1993 | Eiband et al. |
| 5,259,571 A | 11/1993 | Blazquez |
| 5,277,380 A | 1/1994 | Cycon et al. |
| 5,295,643 A | 3/1994 | Ebbert et al. |
| 5,297,759 A | 3/1994 | Tilbor et al. |
| 5,351,911 A | 10/1994 | Neumayr |
| 5,383,363 A | 1/1995 | Kulmaczewski |
| 5,407,150 A | 4/1995 | Sadleir |
| 5,421,538 A | 6/1995 | Vassa (Suratano Thienphropa) |
| 5,429,542 A | 7/1995 | Britt, Jr. |
| 5,440,817 A | 8/1995 | Watson et al. |
| 5,503,351 A | 4/1996 | Vass |
| 5,552,983 A | 9/1996 | Thornberg et al. |
| 5,575,438 A | 11/1996 | McGonigle et al. |
| 5,634,839 A | 6/1997 | Dixon |
| 5,672,086 A | 9/1997 | Dixon |
| 5,676,344 A | 10/1997 | Graffin |
| 5,746,930 A | 5/1998 | Belcher et al. |
| 5,854,843 A | 12/1998 | Jacknin et al. |
| 5,873,545 A | 2/1999 | Kapin et al. |
| 5,890,441 A | 4/1999 | Swinson et al. |
| 5,904,724 A | 5/1999 | Margolin |
| 5,988,562 A | 11/1999 | Linick |
| 6,050,250 A | 4/2000 | Kerkau |
| 6,053,451 A | 4/2000 | Yu |
| 6,179,247 B1 | 1/2001 | Milde, Jr. |
| 6,224,452 B1 | 5/2001 | Morse |
| 6,227,485 B1 | 5/2001 | Porte |
| 6,254,032 B1 | 7/2001 | Bucker |
| 6,260,796 B1 | 7/2001 | Klingensmith |
| 6,270,036 B1 | 8/2001 | Lowe, Jr. |
| 6,270,038 B1 | 8/2001 | Cycon et al. |
| 6,273,370 B1 | 8/2001 | Colgren |
| 6,302,229 B1 | 10/2001 | Triebel |
| 6,315,667 B1 | 11/2001 | Steinhart |
| 6,332,103 B1 | 12/2001 | Steenson, Jr. et al. |
| 6,351,698 B1 | 2/2002 | Kubota et al. |
| 6,371,406 B1 | 4/2002 | Corcoran |
| 6,375,117 B1 | 4/2002 | Cain |
| 6,398,159 B1 | 6/2002 | Di Stefano |
| 6,421,622 B1 | 7/2002 | Horton et al. |
| 6,431,494 B1 | 8/2002 | Kinkead et al. |
| 6,450,445 B1 | 9/2002 | Moller |
| 6,450,446 B1 | 9/2002 | Holben |
| 6,457,670 B1 | 10/2002 | Geranio et al. |
| 6,464,166 B1 | 10/2002 | Yoeli |

(56) References Cited

U.S. PATENT DOCUMENTS

| | | | |
|---|---|---|---|
| D465,196 S | 11/2002 | Dammar | |
| 6,539,290 B1 | 3/2003 | Vos | |
| 6,547,180 B1 | 4/2003 | Cassidy | |
| 6,572,053 B2 | 6/2003 | Salas | |
| 6,575,401 B1 | 6/2003 | Carver | |
| 6,581,872 B2 | 6/2003 | Walmsley | |
| 6,588,701 B2 | 7/2003 | Yavnai | |
| 6,592,071 B2 | 7/2003 | Kinkead et al. | |
| 6,604,706 B1 | 8/2003 | Bostan | |
| 6,626,078 B2 | 9/2003 | Thornton | |
| 6,694,228 B2 | 2/2004 | Rios | |
| 6,708,920 B2 | 3/2004 | Fukuyama | |
| 6,735,500 B2 | 5/2004 | Nicholas et al. | |
| 6,751,529 B1 | 6/2004 | Fouche | |
| 6,761,637 B2 | 7/2004 | Weston | |
| 6,824,095 B2 | 11/2004 | Mao | |
| 6,843,447 B2 | 1/2005 | Morgan | |
| 6,843,699 B2 | 1/2005 | Davis | |
| 6,847,865 B2 | 1/2005 | Carroll | |
| 6,899,586 B2 | 5/2005 | Davis | |
| 7,002,553 B2 | 2/2006 | Shkolnikov | |
| 7,032,861 B2 | 4/2006 | Sanders, Jr. et al. | |
| 7,145,551 B1 | 12/2006 | Bathiche et al. | |
| 7,219,861 B1 | 5/2007 | Barr | |
| 7,255,623 B2 | 8/2007 | Davis | |
| 7,488,231 B2 | 2/2009 | Weston | |
| 7,497,759 B1 | 3/2009 | Davis | |
| 7,500,917 B2 | 3/2009 | Barney | |
| 7,584,071 B2 | 9/2009 | Lee | |
| 7,614,958 B2 | 11/2009 | Weston | |
| 7,794,302 B2 | 9/2010 | Davis | |
| 7,931,239 B2 | 4/2011 | Pedersen et al. | |
| 8,106,748 B2 | 1/2012 | Lee | |
| 2001/0021669 A1 | 9/2001 | Gabai et al. | |
| 2002/0104921 A1* | 8/2002 | Louvel | A63H 27/04 244/12.1 |
| 2002/0106966 A1 | 8/2002 | Jimenez et al. | |
| 2002/0142699 A1 | 10/2002 | Davis | |
| 2002/0142701 A1 | 10/2002 | Rosenberg | |

OTHER PUBLICATIONS

Gavrilets, Vladislav, "Avionics systems development for small unmanned aircraft", "Diss. Massachusetts Institute of Technology", Jun. 1998.

Gordon, et al., "Rotorcraft Aerial Robot—Challenges and Solutions", "Digital Avionics Systems Conference", Oct. 25-28, 1993.

"USPTO file history of U.S. Pat. No. 7,931,239—cited in Petition for Inter Partes Review, PTAB Case IPR2016-01550, filed Aug. 8, 2016", No original pub date.

"Printout of Website at http://www.aerialroboticscompetition.org/", No original pub date.

"Printout of Website at http://www.aviastar.org/helicopters_eng/bothezat.php", No original pub date.

"USPTO Patent Trial and Appeal Board Case IPR2016-01550 (U.S. Pat. No. 7,931,239) Exhibt: Dr. Girish Chowdhary declaration of Aug. 8, 2016, 134 pages".

"U.S. Federal District Court Case 1:16-cv-00682-GMS for Declaratory Judgment re U.S. Pat. No. 7,931,239 and U.S. Pat. No. 9,073,532, filed Aug. 8, 2016, 13 pages".

"Printout of Website at https://en.wikipedia.org/wiki/File:Lift_curve.svg", No original pub date.

"Printout of Website at https://www.grc.nasa.gov/www/k-12/airplane/right2.html", No original pub date.

"Printout of Website at http://www.aerialroboticscompetition.org/pastmissions.php", No Original pub date.

"USPTO Patent Trial and Appeal Board Case IPR2016-01550 re U.S. Pat. No. 7,931,239, Petition for Inter Partes Review, dated Aug. 8, 2016, 88 pages".

"Printout of Website at http://www.aerialroboticscompetition.org/past_missions/pastmissionimages/mission3/robots2.png", No original pub date.

"USPTO Patent Trial and Appeal Board Case IPR2016-01550 (U.S. Pat. No. 7,931,239) Exhibit: J. Coral Sheldon-Hess declaration of Aug. 8, 2016, 11 pages".

"U.S. Appl. No. 60/324,931, unpublished, filed Sep. 27, 2001, 38 pages".

"Printout of Website at https://upload.wikimedia.org/wikipedia/commons/thumb/5/59/Quadrotorhover.svg/220px-Quadrotorhover.svg.png", No original pub date.

"USPTO file history of U.S. Pat. No. 9,073,532—cited in Petition for Inter Partes Review, PTAB Case IPR2016-01559, filed Aug. 8, 2016", No original pub date.

"USPTO Patent Trial and Appeal Board Case IPR2016-01559 (U.S. Pat. No. 9,073,532) Exhibt: Dr. Girish Chowdhary declaration of Aug. 8, 2016, 153 pages".

"USPTO Patent Trial and Appeal Board Case IPR2016-01550 re U.S. Pat. No. 9,073,532, Petition for Inter Partes Review, dated Aug. 8, 2016, 89 pages".

"USPTO Patent Trial and Appeal Board Case IPR2016-01559 (U.S. Pat. No. 9,073,532) Exhibit: J. Coral Sheldon-Hess declaration of Aug. 8, 2016, 11 pages".

Shim, et al., "A comprehensive study of control design for an autonomous helicopter", "Proc. 37th IEEE Conf. on Decision and Control (CDC'98),", Dec. 1998.

Shim, et al., "Hierarchical control system synthesis for rotorcraft-based unmanned aerial vehicles", "AIAA Guidance, Navigation and Control Conference.", Aug. 14-17, 2000.

Weilenmann, et al., "Robust helicopter position control at hover", "American Control Conference, 1994. vol. 3. IEEE", Jan. 1994.

"USPTO Patent Trial and Appeal Board Case IPR2016-01550 re U.S. Pat. No. 7,931,239, Patent Owner's Preliminary Response to Petition, dated Nov. 22, 2016, 66 pages."

"USPTO Patent Trial and Appeal Board Case IPR2016-01550 (U.S. Pat. No. 7,931,239) Nov. 22, 2016 Patent Owner Exhibit 2002: U.S. Pat. No. 9,073,532 to Pedersen et al., dated Jul. 7, 2015, 55 pages."

"USPTO Patent Trial and Appeal Board Case IPR2016-01550 and IPR2016-01559 (U.S. Pat. No. 7,931,239 and U.S. Pat. No. 9,073,532) Patent Owner Exhibit 2005: John P. Condon declaration of Nov. 22, 2016, 26 pages."

"USPTO Patent Trial and Appeal Board Cases IPR2016-01550 and IPR2016-01559 (U.S. Pat. No. 7,931,239 and U.S. Pat. No. 9,073,532) Nov. 22, 2016 Patent Owner Exhibit 2004: Complete file history of U.S. Pat. No. 7,931,239, 478 pages."

"USPTO Patent Trial and Appeal Board Cases IPR2016-01550 and IPR2016-01559 (U.S. Pat. No. 7,931,239 and U.S. Pat. No. 9,073,532) Nov. 22, 2016 Patent Owner Exhibit 2003: Complete file history of U.S. Pat. No. 9,073,532, 425 pages."

"USPTO Patent Trial and Appeal Board Cases IPR2016-01550 and IPR2016-01559 (U.S. Pat. No. 7,931,239 and 9,073,532) Nov. 22, 2016 Patent Owner Exhibit 2006: U.S. Pat. No. 6,179,247 to Milde, dated Jan. 30, 2001, 20 pages."

"USPTO Patent Trial and Appeal Board Cases IPR2016-01550 and IPR2016-01559 (U.S. Pat. No. 7,931,239 and U.S. Pat. No. 9,073,532) Nov. 22, 2016 Patent Owner Exhibit 2001: PCT Publication No. WO2004101357A2 of Spirov et all, dated Nov. 25, 2004, 58 pages."

"USPTO Patent Trial and Appeal Board Cases IPR2016-01550 and IPR2016-01559 (U.S. Pat. No. 7,931,239 and U.S. Pat. No. 9,073,532) Nov. 22, 2016 Patent Owner Exhibit 2007: Miniature Aircraft USA X-Cell 60 helicopter—drawings and manual, dated Jan. 9, 1995, 73 page".

"USPTO Patent Trial and Appeal Board Case IPR2016-01559 re U.S. Pat. No. 9,073,532, Patent Owner's Preliminary Response to Petition, dated Nov. 22, 2016, 84 pages."

"USPTO Patent Trial and Appeal Board Case IPR2016-01559 (U.S. Pat. No. 9,073,532) Nov. 22, 2016 Patent Owner Exhibit 2002: U.S. Pat. No. 7,931,239 to Pedersen et al., dated Apr. 26, 2011, 53 pages."

"Case IPR2014-00730 re U.S. Pat. No. 7,584,071, PTAB Decision to Institute Inter Partes Review, dated Oct. 28, 2014, 20 pages".

(56) References Cited

OTHER PUBLICATIONS

"Case IPR2014-00732 re U.S. Pat. No. 8,106,748, PTAB Decision to Institute Inter Partes Review, dated Oct. 28, 2014, 15 pages".
USPTO Patent Trial and Appeal Board Case IPR2017-01089 (U.S. Pat. No. 7,931,239) Exhibit: Dr. Girish Chowdhary declaration of Mar. 15, 2017, 140 pages.
Kroo, et al., "The Mesicopter: A Meso-Scale Flight Vehicle NIAC Phase I Final Report", May 31, 1999, Publisher: Stanford University.
Kroo, et al., "The Mesicopter: A Miniature Rotorcraft Concept Phase II Interim Report", Jul. 2000, Publisher: Stanford University.
Kroo, et al., "The Mesicopter: A Miniature Rotorcraft Concept Phase II Final Report", Nov. 2001, Publisher: Stanford University.
Kroo, et al., "Mesoscale Flight and Miniature Rotorcraft Development.", Jan. 2002, pp. 503-517, Publisher: Published in T.J. Mueller, Fixed and Flapping Wing Aerodynamics for Micro Air Vehicle Applications, Progress in Astronautics and Aeronautics.
Committee on Materials, Structures, and Aeronautics for Advanced Uninhabited Air Vehicles, "Uninhabited Air Vehicles: Enabling Science for Military Systems", "Publication NMAB-495", 2000 no month listed, Publisher: National Academy Press, Washington, D.C.
USPTO Patent Trial and Appeal Board Case IPR2017-01089 re U.S. Pat. No. 7,931,239, Petition for Inter Partes Review, dated Mar. 15, 2017, 106 pages.
USPTO Patent Trial and Appeal Board Case IPR2017-01089 (U.S. Pat. No. 7,931,239) Exhibit: Coral Sheldon-Hess declaration of Mar. 15, 2017, 333 pages.
"Printout of Webpage at: https://en.wikipedia.org/wiki/File:USN_hovercraft.jpg", No original pub date.
USPTO Patent Trial and Appeal Board Case IPR2017-01090 (U.S. Pat. No. 9,073,532) Exhibit: Dr. Girish Chowdhary declaration of Mar. 15, 2017, 148 pages.
USPTO Patent Trial and Appeal Board Case IPR2017-01090 re U.S. Pat. No. 9,073,532, Petition for Inter Partes Review, dated Mar. 15, 2017, 103 pages.
USPTO Patent Trial and Appeal Board Case IPR2017-01090 (U.S. Pat. No. 9,073,532) Exhibit: Coral Sheldon-Hess declaration of Mar. 15, 2017, 333 pages.
USPTO Patent Trial and Appeal Board Case IPR2016-01550 re U.S. Pat. No. 7,931,239, Decision to Institute Trial, dated Feb. 16, 2017, 37 pages.
USPTO Patent Trial and Appeal Board Case IPR2016-01559 re U.S. Pat. No. 9,073,532, Decision to Institute Trial, dated Feb. 16, 2017, 37 pages.

* cited by examiner

C-C

RADIO-CONTROLLED FLYING CRAFT

CROSS-REFERENCE TO RELATED APPLICATIONS

This application is a divisional of U.S. patent application Ser. No. 14/791,253, filed Jul. 3, 2016, entitled "Method for Operating a Radio-Controlled Flying Hovercraft", which is a divisional of U.S. patent application Ser. No. 13/092,940, filed Apr. 23, 2011, entitled "Homeostatic Flying Hovercraft" (which issued as U.S. Pat. No. 9,073,532 on Jul. 7, 2015), which is a continuation of U.S. patent application Ser. No. 11/838,040, filed Aug. 13, 2007, entitled "Homeostatic Flying Hovercraft," which issued on Apr. 26, 2011 as U.S. Pat. No. 7,931,239, and which was a division of U.S. patent application Ser. No. 10/526,153, filed Jan. 26, 2006, entitled "Homeostatic Flying Hovercraft," which was a national stage entry of PCT Application No. PCT/US03/27415, filed Sep. 2, 2003, entitled "Homeostatic Flying Hovercraft," which claimed priority to U.S. Provisional Application No. 60/407,444, filed Aug. 30, 2002, entitled "Homeostatic Flying Hovercraft," the disclosures of each of which are hereby incorporated by reference.

FIELD OF THE INVENTION

The present invention relates generally to the field of heavier-than-air aeronautical craft that are sustained in air by the force of a fluid such as air. More particularly, the present invention relates to a homeostatic flying hovercraft and to a radio controlled flying saucer toy employing the principals of a homeostatic flying hovercraft.

BACKGROUND OF THE INVENTION

Ever since the term "flying saucer" was first introduced in 1947, the concept of a circular flying craft has become a staple of popular culture. Unlike conventional aircraft in which lift is produced by the difference between the air flowing over the top versus the bottom of a wing, most flying saucers have proposed using the aerodynamic effect of a spinning disc to at least partially generate the lift required for the craft. The flying disc toy known as the Frisbee® is perhaps the best example of this principle. While numerous concepts relating to spinning, flying disc-shaped craft have been put forth in a variety of patents and publications, a practical embodiment of a self-powered flying saucer has yet to be developed.

The concept of a heavier-than-air craft supported by a fluid instead of wings or rotors predates even the Wright brothers' first flight. U.S. Pat. No. 730,097 issued in June 1903 described an airplane controlled by a jet propulsion arrangement that proposed using a pendulum valve to control the operation of the jets as an automatic means to keep the craft in equilibrium. Despite numerous attempts to realize the concept of a craft suspended by downward directed jets, it was more than sixty years later before the Harrier jump jet actually achieved this goal with the first practical vertical-take-off-and-landing (VTOL) aircraft. Even so, the difficulty in controlling and maneuvering such a VTOL aircraft on both take-offs and landings, as well as transitions from vertical to horizontal flight, continues to plague the general acceptance of VTOL aircraft as evidenced by the ongoing difficulties with the US Marine Corps' V-22 Osprey aircraft.

Various attempts have been made to use the inherent stability of a spinning disc or multiple spinning disc arrangement in order to stabilize a fluid suspended flying craft Examples of the use of jet propulsion in connection with a spinning disc are shown in U.S. Pat. Nos. 3,199,809, 3,503,573, 3,946,970, 4,566,699, 5,351,911, 6,050,250, 6,302,229, 6,371,406, 6,375,117, 6,572,053, and 6,575,401. Other examples of spinning annular rings or discs in a saucer-shaped craft are shown in U.S. Pat. Nos. 2,863,261, 4,214,720, 4,273,302, 4,386,748, 4,778,128, 5,072,892, 5,259,571, 6,053,451, 6,270,036, and 6,398,159.

Another approach to supporting a heavier-than-air craft has involved the use of ducted fans, instead of jets or rotors, to provide the necessary thrust for supporting and propelling the craft. Patents directed to the use of ducted fans to support a heavier-than-air craft date back to as early as 1872 and include craft that relied solely on ducted fans (e.g., U.S. Pat. Nos. 129,402, 905,547, 931,966, 996,627, and 1,816,707), as well as craft that used ducted fans in combination with wings (e.g., U.S. Pat. Nos. 1,291,345, 1,405,035, 1,959,270, 2,461,435, 2,968,453 and 6,547,180) or craft using ducted fans in a helicopter-like craft (e.g. U.S. Pat. Nos. 1,911,041, 2,728,537, 3,199,809, 5,503,351, 6,402,488, and 6,450,446).

The first non-spinning disc shaped aerial craft with a single central ducted fan arrangement, as described in U.S. Pat. No. 2,567,392, used shutters to control airflow and orientation of the craft. The problem with this arrangement is similar to the problems encountered with helicopters, namely the rotation of a single fan imparts a one-way spin or torque that must somehow be counteracted in order for the craft to remain stable. Most central ducted fan arrangements have since utilized the concept of two counter-rotating blades spinning on the same axis in opposite directions to overcome this single-fan torque problem. The most famous application of this concept was the 1950's Hiller flying platform as described in U.S. Pat. No. 2,953,321 that was based on work dating back to 1947 by Zimmerman. The Hiller flying platform was controlled by having the operator shift his weight to alter the center of gravity of the craft.

Other craft that use the co-axial counter-rotating blades for a central ducted fan arrangement have used vanes, louvers and duct arrangements to control airflow from the ducted fans in order to control orientation of the craft (e.g., U.S. Pat. Nos. 2,728,537, 3,442,469, 3,677,503, 4,795,111, 4,804,156, 5,178,344, 5,203,521, 5,295,643, 5,407,150, 6,450,445, and 6,588,701). Patents also have described craft that use a pivoting central ducted fan arrangement to control airflow and orientation (e.g., U.S. Pat. Nos. 2,730,311, 2,876,965, 2,968,318, 5,421,538 and 6,224,452). Still other patents have described central ducted fan craft that used variable pitch angle blades to control the airflow and orientation of the craft (e.g., U.S. Pat. Nos. 2,968,318, 3,002,709, and 3,395,876). The addition of tail fins and tail rotors or tail jet engines to a central ducted fan craft has been described in several patents (e.g., U.S. Pat. Nos. 2,988,301, 4,796,836, 5,035,377, 5,150,857, 5,152,478, 5,277,380, 5,575,438, 5,873,545, 6,270,038, 6,457,670, and 6,581,872). The addition of a gyroscope mounted to and rotated by the propellers of the ducted fan to aid in stabilization of the craft has been described in U.S. Pat. Nos. 4,461,436 and 6,604,706. Combinations of one or more of the control techniques have also been proposed in many of these patents as well as in U.S. Pat. No. 4,196,877.

Ever since the 1950's, there have been sporadic research projects sponsored primarily by various military organizations on the design of enclosed rotorcraft vehicles. All of these designs to date have utilized a single-axis rotor inside a cowl or protective ring arrangement that forms a ducted fan. The most successful implementation of a single-axis counter-rotating ducted fan arrangement has been the Cypher™ unmanned air vehicle (UAV) from United Technologies Corp. that operates as a single-axis VTOL craft. The Cypher™ has been effectively used as a drone surveillance probe by the military when remotely piloted by experienced UAV pilots.

Recently, the military has started funding development of smaller unmanned air vehicles known as Organic Air Vehicles (OAVs) that are intended to be small (<24" diameter) field-deployable remote controlled flying vehicles. Two multi-million dollar research and development contracts were granted in 2001 for the OAV program. Both contracts sought to extend the single-axis VTOL concept that is the basis for all military enclosed rotorcraft into a number of smaller sizes. The VTOL craft for the OAV program is designed to be oriented upright for takeoff and landings and transition into a sideways orientation for flight. As one might expect, the trickiest part of controlling this craft occurs during the transitions between vertical and horizontal orientations.

In March 2002, the OAV design from Honeywell known as the Kestrel was selected for further funding. The Kestrel design is a conventional VTOL single axis rotorcraft that looks like a 5 pound coffee can with bunny ears and legs and is powered by a gas engine in the center and a pair of fuel carrying/payload bearing pods mounted on the sides. The Kestrel design has three sizes from 9-29 inches, with payloads ranging from 8 ounces to 18 pounds and an expected price tag of $10,000-$25,000 per unit. Available information indicates that these OAV's are being designed for automated self-piloting based on GPS coordinates and complex object recognition vision systems. Currently available information indicates that the smaller OAV models of the Kestrel project are still not ready for use. For more information on the current status of unmanned aircraft development, see "Future of Unmanned Aviation," Popular Science, June, 2003.

One alternative to the VTOL central ducted fan arrangement is the use of a pair of counter-rotating ducted fan arrangements that has been proposed in both side-to-side and front-and-back positions in a craft (e.g., U.S. Pat. Nos. 2,077,471, 2,988,301, 3,752,417, 5,049,031, 5,064,143, 5,213,284, 5,746,930, 5,890,441, and 6,464,166). A very early proposal for a ducted fan craft using more than a pair of ducts was described in 1911 by Gridley in U.S. Pat. No. 1,012,631. Grindley showed the use of four ducted fans to produce a balanced (even) effect on the plane of the body of the craft, but no control arrangement for the fans was described. U.S. Pat. No. 4,795,111 described an alternate embodiment of a UAV that employed four ducts and briefly proposed altering fan pitch control or throttle control as a means for controlling this embodiment. U.S. Pat. Nos. 6,179,247 and 6,254,032 describe proposed flying passenger craft that use ten or more ducted fans arranged in an equidistant manner in a ring around the craft. Both patents briefly describe a control system that varies the throttle control of different engines. U.S. Pat. No. 6,179,247 also proposes the use of a moveable paddle system to deflect air for purpose of control, whereas U.S. Pat. No. 6,254,032 also proposes that each ducted fan is individually pivotable to control airflow direction.

Until recently, most development efforts in heavier-than-air craft that are fluid sustained using ducted fans of the like have been focused on larger passenger aircraft of UAVs. Recent advances in battery technology have generated a renewed interest in the field of remote controlled aircraft and smaller OAVs. Instead of conventional gas-powered engines, a combination of high-powered batteries and lightweight electrical motors have been used as replacement engines for model airplanes and model helicopters. While this represents an improvement in terms of simplicity and operability, model airplanes, and particularly model helicopters, are still expensive, complicated, temperamental and fragile hobby toys that can require months to build, learn, rebuild and master.

Various powered spinning disc toys and models have attempted to address the control and stability problems associated with model airplanes and model helicopters using many of the same approaches described above. These include single rotor model craft (e.g., U.S. Pat. Nos. 3,394,906, 3,477,168, 3,528,284, 3,568,358, 3,608,033, 4,065,873 and 5,429,542), dual counter-rotating rotor model craft (e.g., U.S. Pat. Nos. 2,949,693, 5,071,383, 5,634,839, 5,672,086, and 6,053,451) and even rocket or jet-powered models (e.g., U.S. Pat. Nos. 3,508,360 and 4,955,962). U.S. Pat. No. 5,297,759 describes a disc-shaped model craft that uses two conventional aircraft propellers mounted at an angle of about 30 degrees on the surface of the disc to rotate the disc to provide both lift and propulsion.

More recently, variations on the conventional model helicopter have been introduced utilizing multiple main rotors, each powered by a separate electrical motor. The Hoverfly® II is perhaps the best example of such a craft that utilizes three main rotors and a tail rotor in a classic helicopter format. The Ultimate Flying Saucer™, the GyroSaucer™ and the DraganFlyer III™ utilize four rotors (two pairs of counter-rotating rotors) in a helicopter-like fashion to provide lift for the model craft, but do not have a separate tail rotor. Instead, the DraganFlyer III™ uses three piezoelectric oscillation gyros to transmit flight data to an on-board computer to provide balanced reciprocal thrust among the rotors. Another variation on this approach is the Vectron™ Blackhawk that integrates a rotating outer ring with three rotor blades to provide lift for the craft.

Unfortunately, each of these craft is still difficult to control and maneuver and all of these craft rely on multiple conventional helicopter rotors to provide aerodynamic lift, rotors that are easily damaged in the event of a crash. Like all exposed rotor craft, these multi-rotor models are also inherently dangerous due to the exposed spinning rotors.

The most extensive research project using ducted fans instead of rotor blades was conducted by a research group at Stanford University for a NASA project to design miniature flying craft to be used for aerial mapping of Mars. The design known as a "mesocopter" calls for a very tiny battery-powered four rotor craft less than two inches across. In one version, the four tiny rotors are each shrouded in a protective ring. While the research is interesting, the project has no practical guidance on how to make a model-sized RC flying craft for here on Earth because of the differences in gravity and air density as compared to Mars.

A design concept for a model flying hovercraft powered by ducted fans has been proposed by a student at MIT. Although his design proposed the use of counter-rotating ducted fans to power the craft, he has never been able to make the design work. Control of his 4 ducted fan design was to be achieved by using three separately controlled fins, one for yaw, one for left-right and one for back-forth. While some interesting concepts were proposed, a workable prototype was never achieved and no further work on the project has been reported.

Whether the craft is a single-axis VTOL, ducted fan UAV or OAV, a multi-rotor model RC craft, or a multiple ducted fan craft, the main challenges with all of the existing designs for fluid sustained aircraft are case of control and stability of flight. Manually flying any of these craft requires extensive training and skills. Unfortunately, the automated self-piloting systems capable of attempting to assist with flying any of these craft are all based on the complicated and expensive inertial guidance auto-pilot systems used in airplanes today.

Existing autopilot systems, such as the state-of-the-art Honeywell Fault-Tolerant Air Data Inertial Reference System (FT/ADIRS), use one or more gyroscopes to sense rotation about an axis in the form of angular velocity detection. The FT/ADIRS, for example, is comprised of a six-sided structure holding six ring laser gyros and six accelerometers. A myriad of backup and redundant power supplies and computer systems are integrated with this system to prevent a mid-flight failure.

The basic reason for the use of very high precision laser ring gyros and multiple redundancies is that existing inertial guidance systems all rely on an initial static determination of the gravitational reference to be used by the system. In the case of an autopilot system, the gravitational reference or ground horizon reference is established when the plane is on the ground. This process, commonly referred to as bore-sighting, establishes the gravitational reference for down. Once this gravitational reference is established, it is essentially static and unchanging and the auto-pilot system uses the gyros to keep very precise track on a dead-reckoning basis of all changes in the attitude of the craft from the point of the ground plane reference. This complicated referencing to a static ground plane reference can be augmented dynamically by obtaining positional information from a global positioning satellite (GPS) system, but GPS systems are not precise enough to detect small changes in attitude of a craft on a continual basis.

Ideally, the ground plane reference could be dynamically updated on a continual basis when the craft was in the air, thus eliminating the need for the complicated gyro based inertial guidance systems. Unfortunately, mechanical sensors such as pendulums, gyros and piezo-accelerometers do not function the same in dynamic situations where the sensors are continually subjected to multiple acceleration fields. The impact of precession on those sensors means that the sensor readings will provide an incorrect ground plane reference. By example, a pendulum is a very simple and effective gravitational sensor in a static context. If a pendulum is subjected to a centripetal acceleration in addition to gravitational acceleration by swinging the pendulum in a circle, for example, then the "reading" of the pendulum will not point down. Instead, the pendulum will point in a direction that is a combination of both the gravitational acceleration and the centripetal acceleration. This phenomenon is further complicated in situations where the craft is in a parabolic dive, for example, when the tilt of the craft is equal to the rate of acceleration of the dive. In this situation, referred to as the "death spiral," the forces on sensor are balanced so that the sensors typically give no useful output readings in this situation.

U.S. Pat. No. 5,854,843 describes a virtual navigator inertial angular measurement system that uses gyros to sense angular velocity and piezo-accelerometers to correct for drift in the gyros. While the piezo-accelerometers are referred to in this patent as "absolute" references, it is understood that these piezo-accelerometers are absolute only with respect to the initial gravitational ground plane established by a bore-sighting process. The need for this initial boresighting is confirmed by the fact that the invention touts the advantage of being stable for long periods of time. If an inertial guidance system were able to dynamically update its initial gravitational ground plane, then the need for "stability" over extended periods of time is eliminated.

Examples of current state of the art inertial navigational reference systems for aviation that use a gyro-based angular rate sensing arrangement similar to that described in U.S. Pat. No. 5,854,843 are shown in U.S. Pat. Nos. 5,440,817, 5,676,334, 5,988,562, 6,227,482, 6,332,103, 6,421,622, 6,431,494, and 6,539,290. While certain references indicate that a gyro sensor can be a gravitational detector of down, it must be understood that this statement is valid only under static conditions or in a limited set of acceleration circumstances where the output of the sensor is not compromised by the acceleration fields. U.S. Pat. No. 6,273,370 attempts to overcome these limitations by trying to keep track of different states of the sensor system and determining a course of action based on the different state conditions. Still, if the sensor system loses track of the state of the sensor system, even this arrangement cannot dynamically determine an inertial gravitational reference to use as a reference.

What is needed is a heavier-than-air flying craft that has the ability to hover and to perform vertical air movements like a conventional model helicopter, yet is easier to operate and more durable than existing flying machines.

SUMMARY OF THE INVENTION

The present invention is a homeostatic flying hovercraft that preferably utilizes at least two pairs of counter-rotating ducted fans to generate lift like a hovercraft and utilizes a homeostatic hover control system to create a flying craft that is easily controlled. The homeostatic hover control system provides true homeostasis of the craft with a true fly-by-wire flight control and control-by-wire system control.

In one embodiment, the flying hovercraft is a flying saucer shaped over-powered skirtless hovercraft capable of up/down, lateral and yaw, pitch and roll flight maneuvers by mimicking the position of the craft to the position of a remote controller. Preferably, control is fluidly intuitive by seamlessly utilizing a series of pre-established operational orientations associated with each of the positions of the craft that result in balanced and controlled flight positions. The homeostatic hover control system removes the need for the pilot to be concerned with moment-to-moment balance/stabilization and control of the craft and focus instead only on the intended motion in which the craft is to be directed.

Instead of trying to use the rotation of the craft or the spinning of rotor blades to provide aerodynamic lift, the preferred embodiment of the homeostatic flying saucer uses four battery-powered ducted fans housed completely inside the craft to produce four controlled cones of thrust beneath the craft. A novel control system balances the four cones of thrust to keep the craft stable and to cause the craft to move in a desired direction. The fan blades are specially designed to make the most efficient use of the increased power provided by permanent magnet motors while also reducing fan noise both because the blades spin somewhat slower than conventional blades and because of the unique aerodynamic design features of the ducted fan blades.

The homeostatic control system of the preferred embodiment incorporates many different features to enable the craft to achieve homeostasis or self-stabilization. The ducted fans are angled slightly outward such that the four cones of thrust have an inherent balancing effect, much like the bottom of a Weeble® toy that wobbles but doesn't fall over. The four ducted fans are actually two pairs of counter-rotating fans on opposite sides of the craft. The counter-rotation eliminates the need for anything like a tail rotor to prevent spinning of the craft caused by the spinning of the fans. A hover control system manages the amount of thrust produced by each ducted fan via four speed controllers. The hover control system uses an XYZ sensor arrangement and associated control circuitry that dynamically determines an inertial gravitational reference for use in automatically and continuously determining the speed needed for each fan in order to keep the craft at a desired orientation. Other embodiments of the hover control system support collision avoidance sensors and the ability to automatically change the way the flying hovercraft operates depending upon whether the craft is indoors or outdoors.

In a preferred embodiment, light-weight, high-torque permanent magnet motors power the ducted fans. The preferred embodiment of such permanent magnet motors are described in U.S. Pat. Nos. 6,236,561 and 6,342,746, the disclosures of which are hereby incorporated by reference. Unlike conventional electric motors that use electromagnetic force created by a series of wound coils within the motor to rotate a shaft, these permanent magnet motors control the flow of magnetic flux from powerful permanent magnets to rotate the shaft of the motor. Consequently, when these permanent magnet motors are used to turn a heavy load the motor does not draw additional current from the battery. These one-of-a-kind electric motors provide a combined total in excess of ½ horsepower to the shafts of the four ducted fans, enabling an anticipated thrust-to-weight ratio of greater than 2:1 and preferably greater than 3:1 for an unloaded saucer. As a result, the saucer of the preferred embodiment is able to fly longer and farther than if it were powered by conventional motors that draw increasing amounts of current from the battery in response to increasing loads on the motor.

The unique and intuitive one-handed bee controller also includes an XY sensor arrangement and associated control circuitry that allows the craft to mimic the position of the controller in terms of yaw, pitch, roll and lateral flight maneuvers. In one embodiment, control of the craft is fluidly intuitive by seamlessly utilizing a series of pre-established operational orientations associated with each of a set of positions for the craft that result in balanced and controlled flight orientations. Together, the homeostatic control system and the bee controller eliminate the need for the pilot to be concerned with moment-to-moment balance/stabilization. In one embodiment, the bee controller also features a USB connection port to permit downloading of software updates from the web via an Internet connection.

Unlike existing RC models that use inexpensive low frequency one-way communications, the preferred embodiment of the present invention incorporates state of the art radio frequency communications. A unique 900 MHz communication chip provides a two-way, multi-channel communication link between the controller and the saucer. This high speed multi-channel communication link allows multiple saucers to fly in the same area and communicate with each other to make advanced gaming and coordinated control possible. It also permits extensive data communications both to and from the saucer. Video images and other high bandwidth sensor inputs can be communicated from the saucer to the controller over this link.

In the preferred embodiment, multiple onboard microprocessors receive commands from another microprocessor in the bee controller and, in response, instruct the homeostatic control system on a desired orientation, angle and thrust for the craft. Preferably, radio communications between the microprocessor and the bee controller are used to keep the craft within a programmed maximum distance from the controller and the microprocessor automatically slows and reverses the craft when it approaches the maximum range from the controller. For one embodiment of an RC craft, the maximum distance is 500 feet from the bee controller and the maximum speed is about 25 mph.

In a preferred embodiment, instead of heavier, conventional NiCad rechargeable batteries, state-of-the-art Lithium Polymer rechargeable batteries are used as the electrical power source for powering the permanent magnet motors. Lithium Polymer batteries provide the long-life and high power capacity required for this technology in the lightest and smallest package.

In a preferred embodiment, the flying hovercraft is an RC flying saucer that is constructed of a single EPP foam shell weighing between 30-42 ounces unloaded. Although lightweight, the saucer is designed to withstand free falls of up to 5 feet without damage. Even though it is as lightweight as styrofoam, the advanced EPP foam that forms the shell is actually able to bend and still return to its original shape without breaking.

BRIEF DESCRIPTION OF THE FIGURES

FIG. 22b is a side view of the hand-held bee controller of FIG. 22a.

DETAILED DESCRIPTION OF THE PREFERRED EMBODIMENTS

Figure 17:
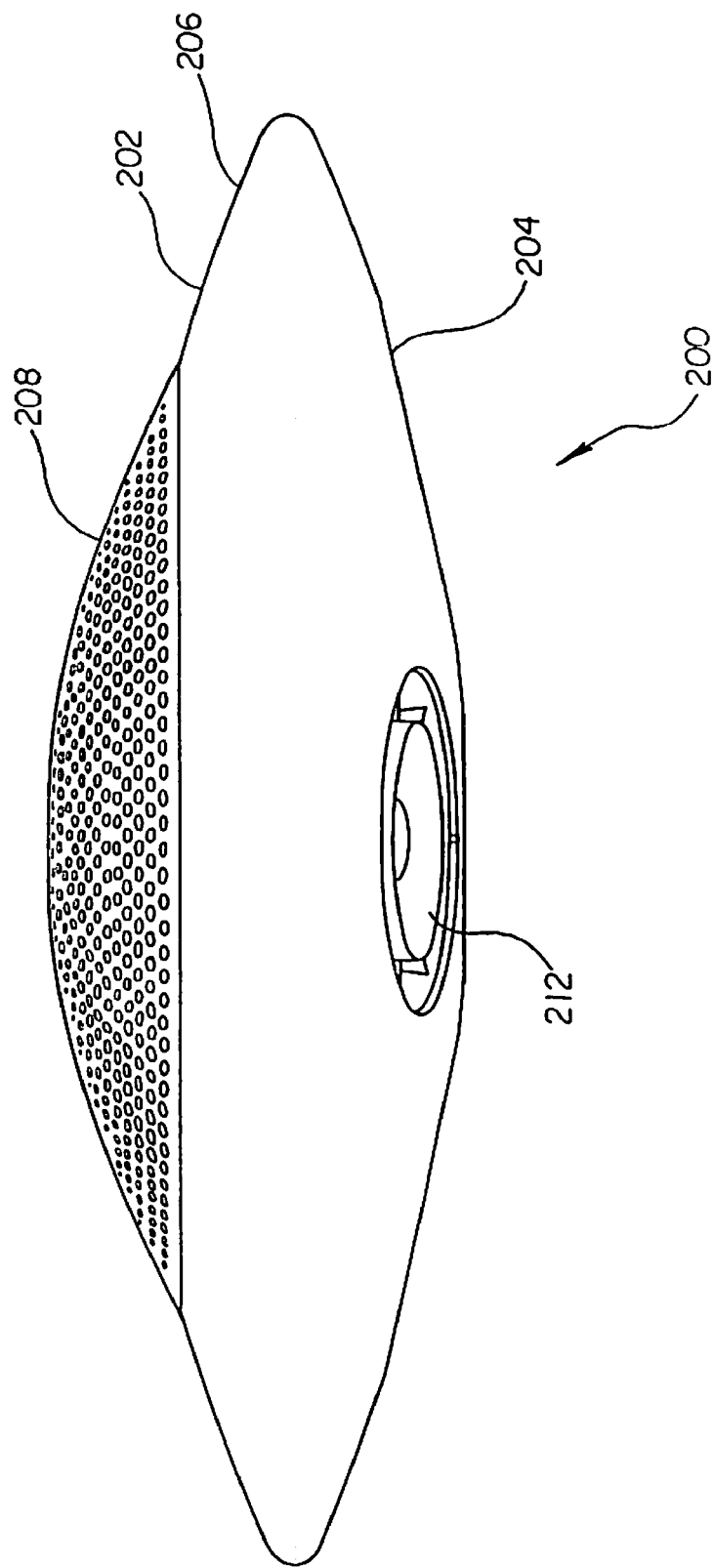
FIG. 17 is a side profile view of the embodiment of FIG. 16.
Figure 18:
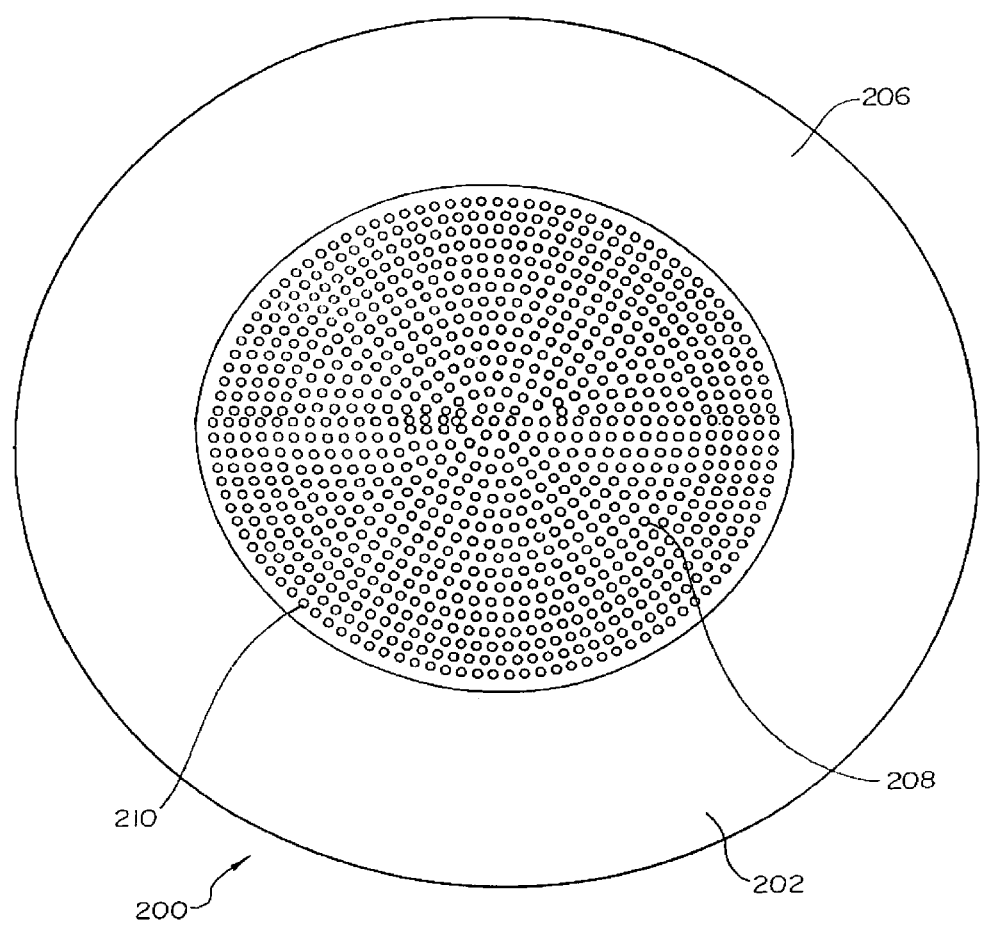
FIG. 18 is a top wireframe view of the embodiment of FIG. 16.
Figure 19:
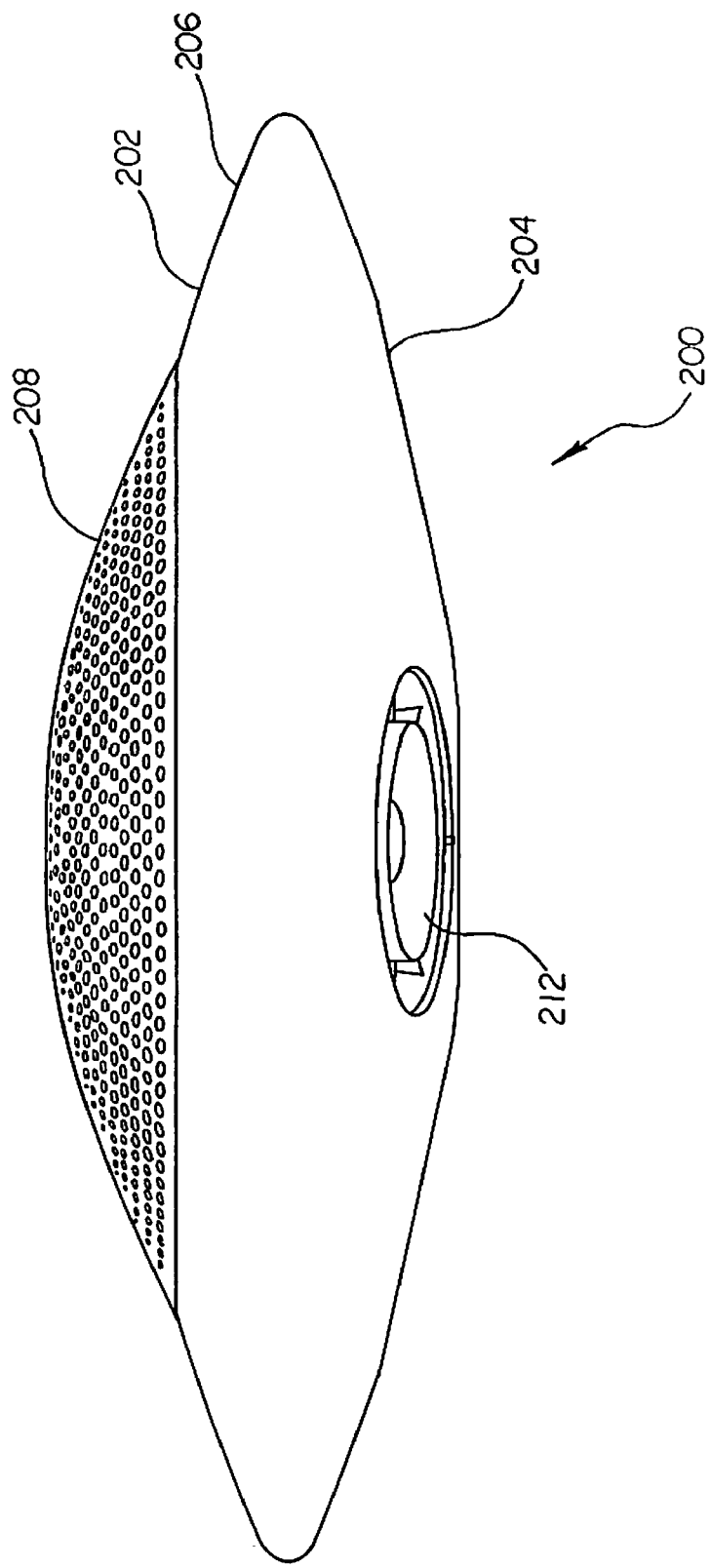
FIG. 19 is a side wireframe view of the embodiment of FIG. 16.
Figure 20:
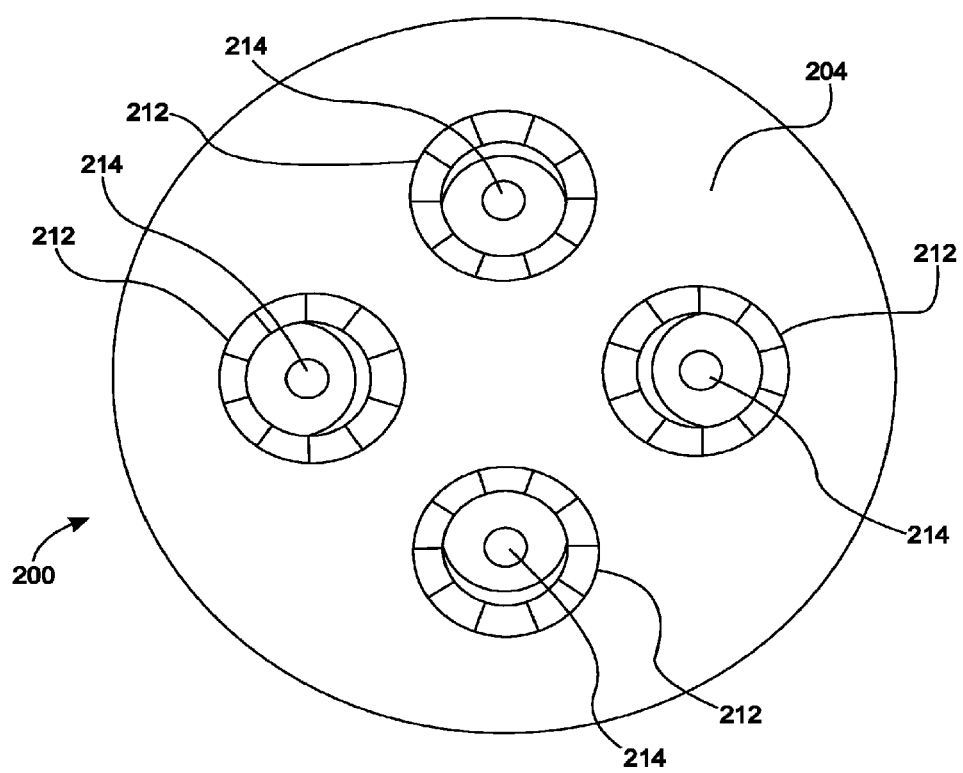
FIG. 20 is a bottom plan view of the embodiment of FIG. 16.

As illustrated in FIGS. 16-20, a preferred embodiment of a homeostatic flying hovercraft 200 is presented in accordance with the present invention. The homeostatic flying hovercraft 200 has generally an ellipsoid shaped body 200, having an upper surface 202 and bottom surface 204. As illustrated in FIG. 18, the upper surface 202 is comprised of a solid outer ring 206 of the saucer body 200 that extends radially inwards from the periphery and a removable cover 208 containing a plurality of ventilation openings 210. Preferably, the cover 208 has a slightly greater curvature as compared to the outer ring 206. The lower surface 204, as illustrated in FIGS. 17 and 20 is a solid structure with four equally spaced circular duct openings 212. As illustrated in FIG. 19, each duct opening 212 preferably is angled at ten to fifteen degrees from the vertical and contains a battery-powered ducted fan 214 mounted inboard from the duct opening 212.

Figure 21:
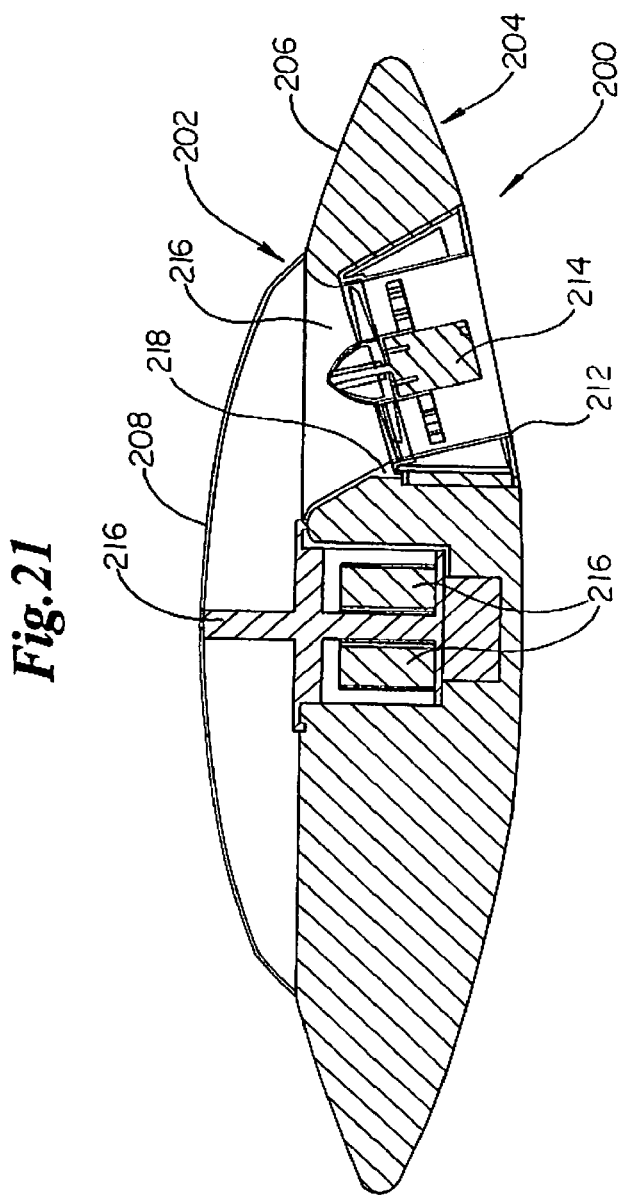
FIG. 21 is a side cutaway view of the embodiment of FIG. 16.

FIG. 21 provides a side cutaway view of the homeostatic flying hovercraft 200 highlighting the placement of one of the battery-powered ducted fan 214. The cover 208 is structurally supported about its outer radius and by a central support pillar 216. The remainder of the structure, comprised of the area between the lower surface 204 and under the outer ring 206 of the upper surface 202 is comprised of a lightweight material such as a single EPP foam shell. Preferably, an air chamber 216 defined between cover 208 and upper surface 202 is upstream from fan 214 and has a frustoconical shape to expand the volume of available air.

Each fan 214 is powered from an internal pair of batteries 216. Instead of heavier, conventional NiCad rechargeable batteries, state-of-the-art Lithium Polymer rechargeable batteries are used as the electrical power source for powering the permanent magnet motors. Lithium Polymer batteries provide the long-life and high power capacity required for this technology in the lightest and smallest package. Motor wire channel 218 operably connects the battery 216 to the fan 214.

Figure 22A:
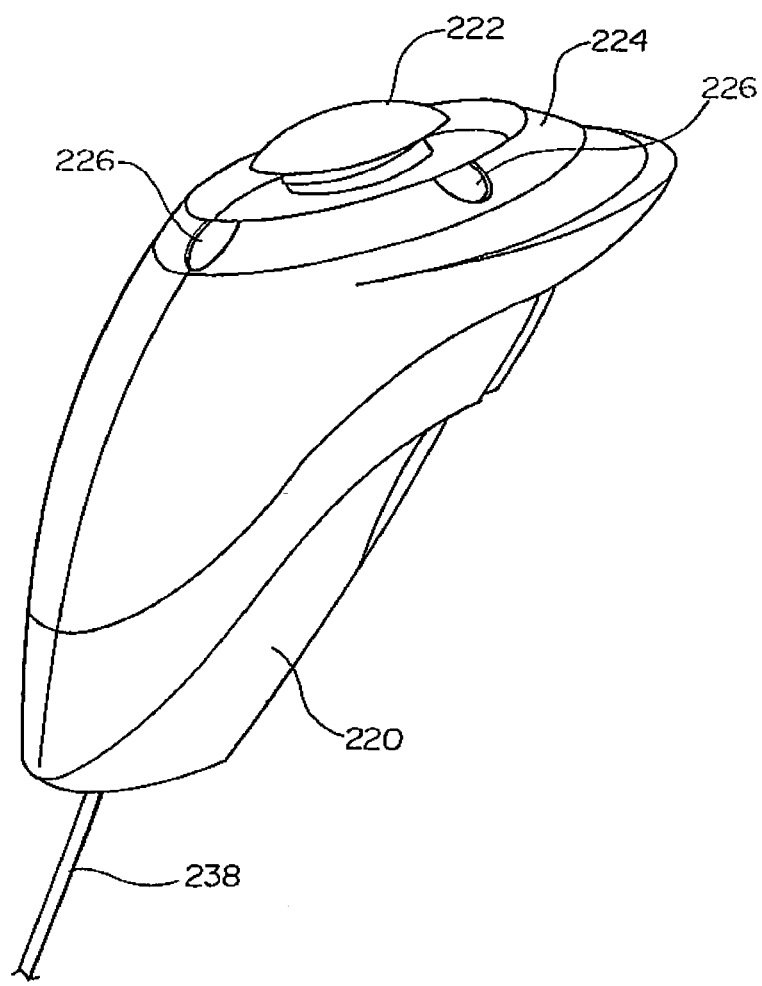
FIG. 22a is an isometric view of a hand-held bee controller for the embodiment of FIG. 16.
Figure 22B:
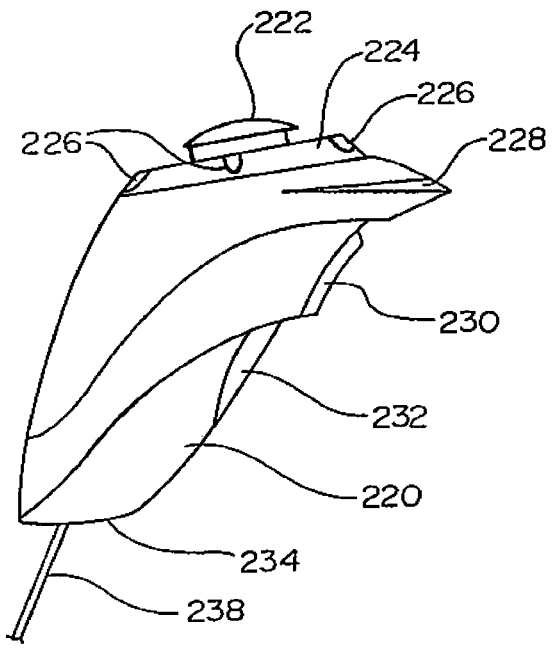

FIGS. 22a and 22b illustrate the hand-held bee controller 220 of the homeostatic flying hovercraft 200. The hand-held bee controller 220 preferably includes a control stick 222 mounted on the upper control surface 224 for thumb control. Directly below the control stick 222 on the upper control surface 224 are a plurality of directional LEDs 226 and a LED power indicator 228. The directional LEDS 226 are disposed to represent the four directions. The hand-held bee controller 220 is designed to be held in the palm of one hand so that the fingers contact the four-way video control pad 230 and power button 232 while the thumb engages the control stick 222. Preferably, a USB port 234 is disposed on the aft face 236 along with antenna 238. The USB connection port 234 permits downloading of software updates from the web via an Internet connection.

Unlike existing RC models that use inexpensive low frequency one-way communications, the preferred embodiment of the present invention incorporates state of the art radio frequency communications. A unique 900 MHz communication chip provides a two-way, multi-channel communication link between the controller 220 and the saucer 200. This high-speed multi-channel communication link allows multiple saucers to fly in the same area and communicate with each other to make advanced gaming and coordinated control possible. It also permits extensive data communications both to and from the saucer 200. Video images and other high bandwidth sensor inputs can be communicated from the saucer 200 to the controller 220 over this link.

It will be recognized that use of the hand-held bee controller is not limited to a flying saucer but can be used to remotely control any radio controlled (RC) aircraft in a true control-by-wire, fly-by-wire construct. The hand-held RC controller includes a body adapted to be held in one hand. A homeostatic control system IS positioned within the body to sense a desired orientation of the RC controller by a user selectively positioning an orientation of the RC controller. The homeostatic control system includes an XYZ sensor arrangement and associated control circuitry as previously described that dynamically determines an inertial gravitational reference for use in sensing the desired orientation. The RC controller also includes a bidirectional radio frequency (RF) transceiver providing two-way RF communications between the RC aircraft and the hand-held RC controller that communicates the desired orientation to the RC aircraft.

The RC aircraft includes at least one motor that provides motive force to the RC aircraft and a power source operably connected to the at least one motor and carried within the RC aircraft. The motor and power source can be electric or gas powered. A homeostatic control system is operably connected to the at least one motor to automatically control the motor in order to maintain the desired orientation of the RC aircraft. The homeostatic control system also includes an XYZ sensor arrangement and associated control circuitry as described above that dynamically determines an inertial gravitational reference for use in automatic control of the at least one motor. Finally, the RC aircraft has a bidirectional radio frequency (RF) transceiver providing two-way RF communications between the RC aircraft and the hand-held RC controller.

Figure 23:
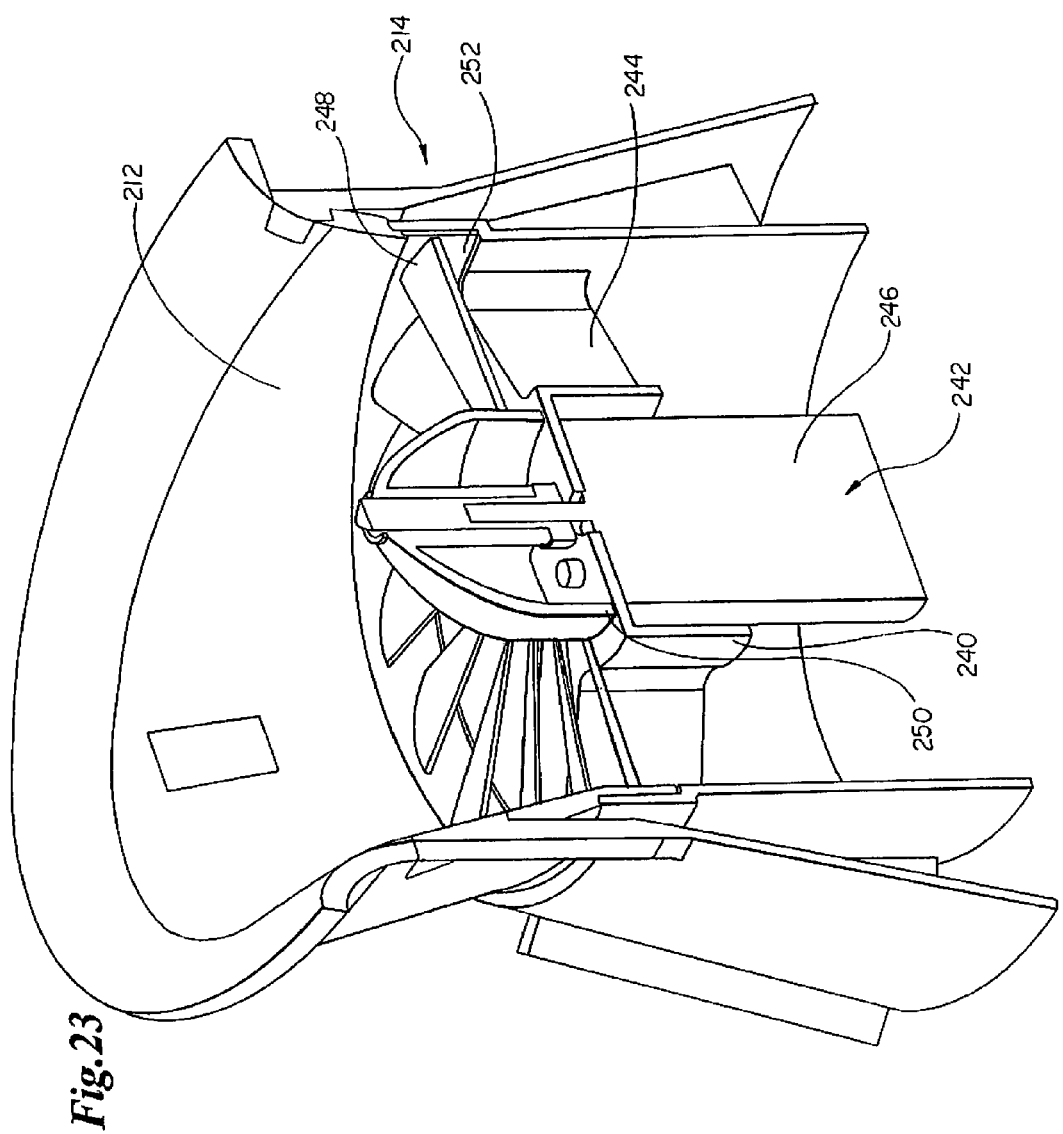
FIG. 23 is a cutaway view of one of the ducted fan assemblies of the embodiment of FIG. 16.
Figure 24:
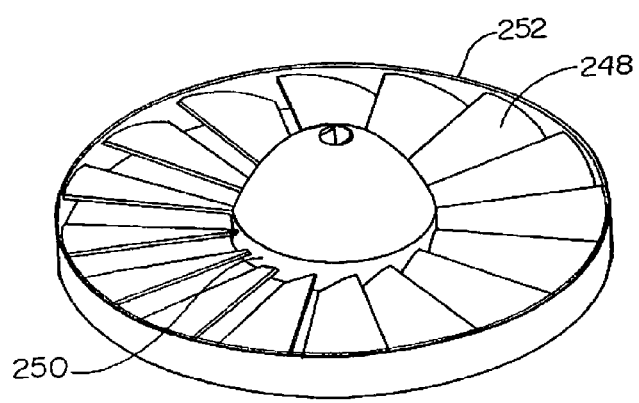
FIG. 24 is an isometric view of a fan blade for the ducted fan assembly of FIG. 23.
Figure 25:
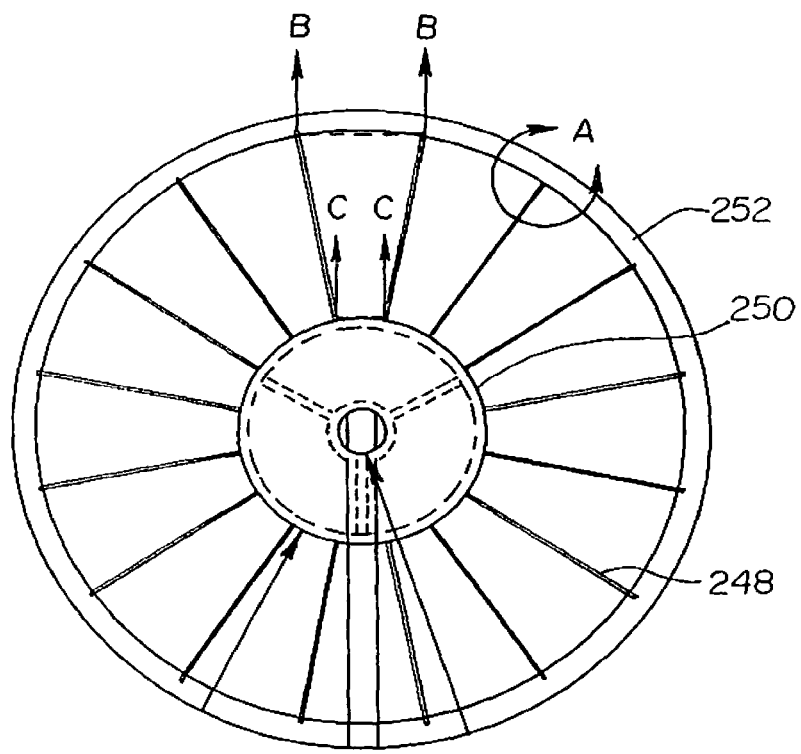
FIG. 25 is a top plan view of the fan blade of FIG. 24.
Figure 26:
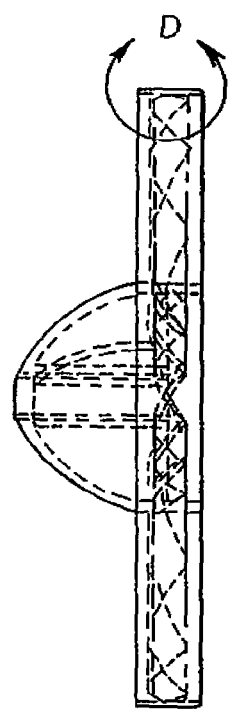
FIG. 26 is a side view of the fan blade of FIG. 24.
Figure 27A:
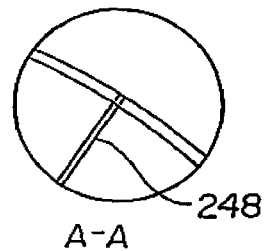
FIGS. 27a, 27b, 27c and 27d are detail segment views of the fan blade of FIG. 24.
Figure 27B:
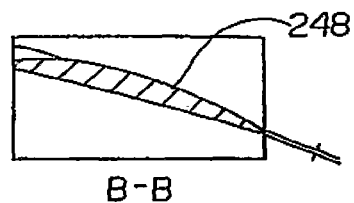
Figure 27C:
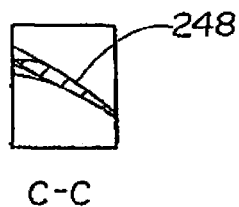
Figure 27D:
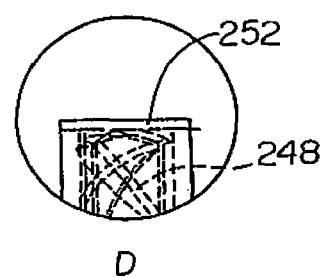
Figure 28:
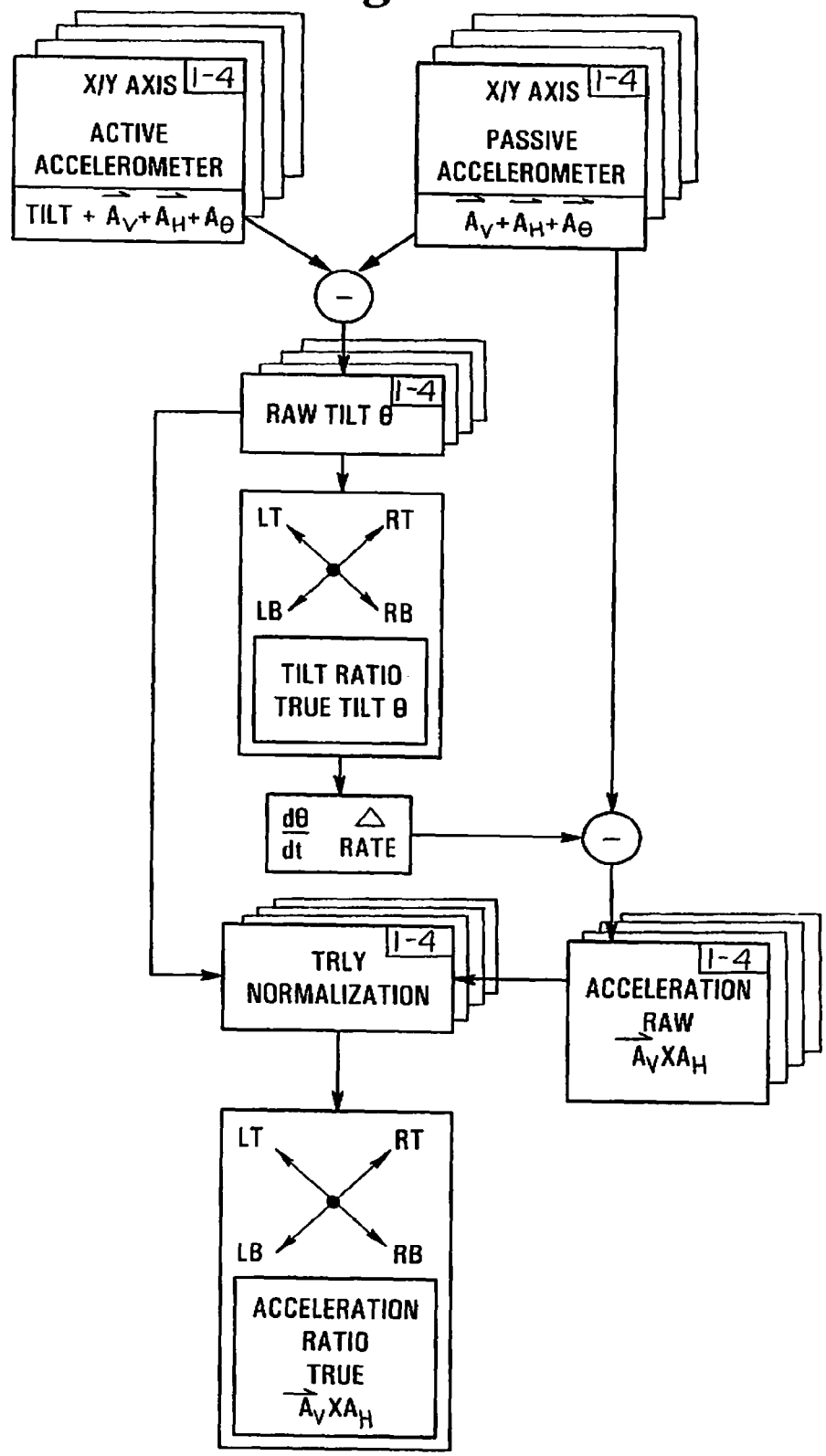
FIG. 28 is an overall block diagram of a preferred embodiment of the homeostatic control system.
Figure 29:
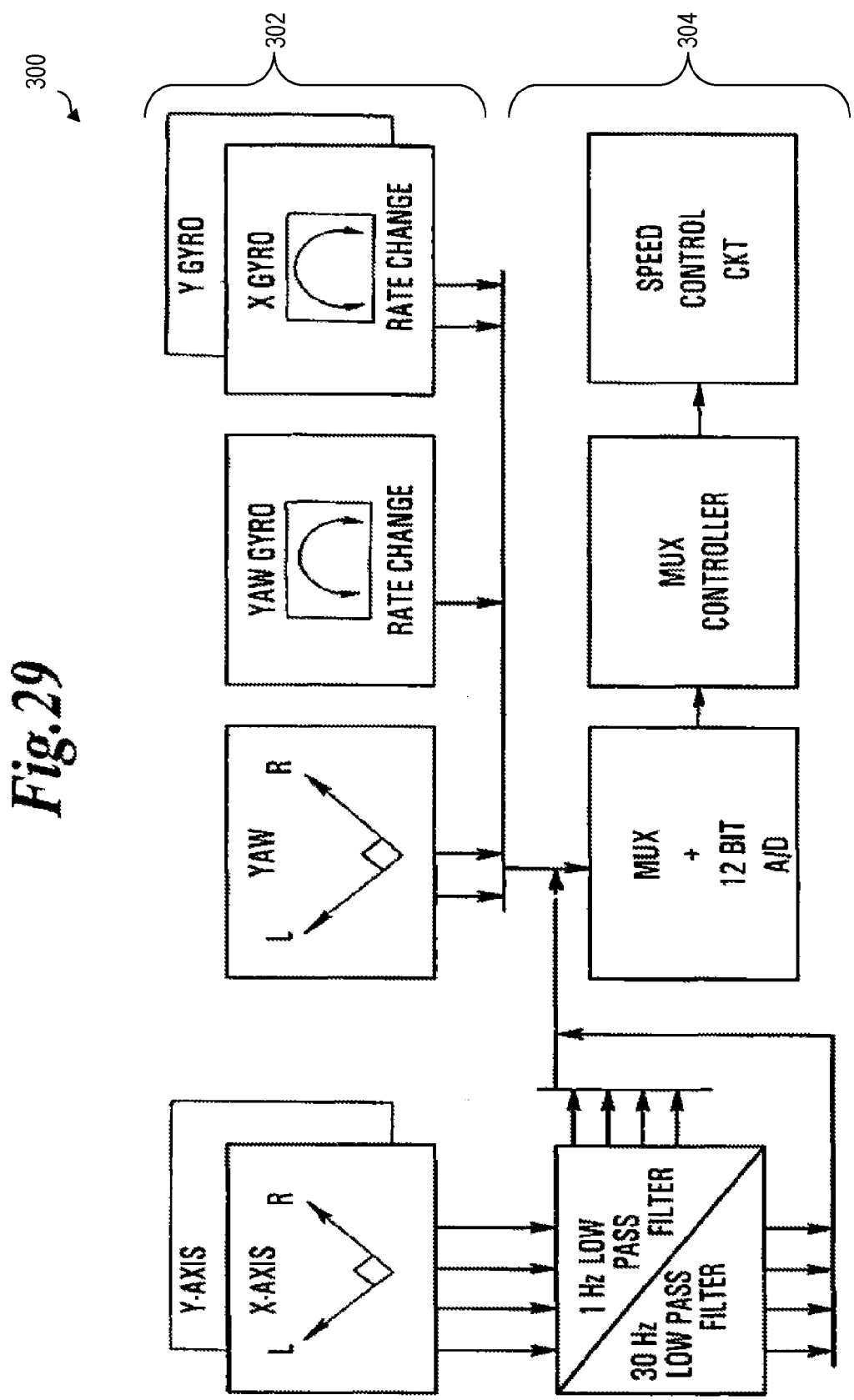
FIG. 29 is a detailed block diagram of one embodiment of the homeostatic control system of FIG. 28.
Figure 30A:
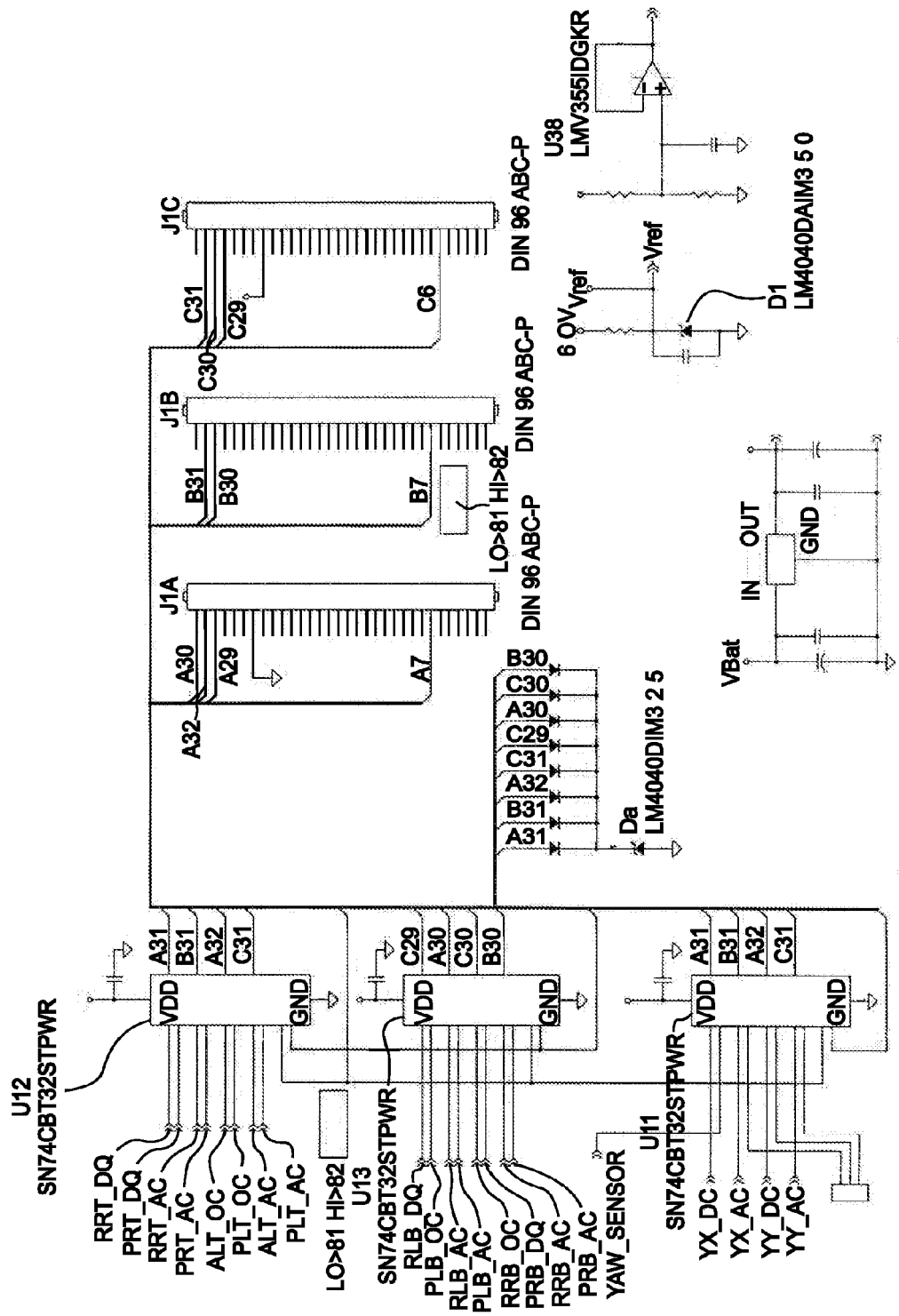
FIGS. 30a-30g are detailed schematic circuit diagrams of the embodiment of the homeostatic control system of FIG. 29.
Figure 30B:
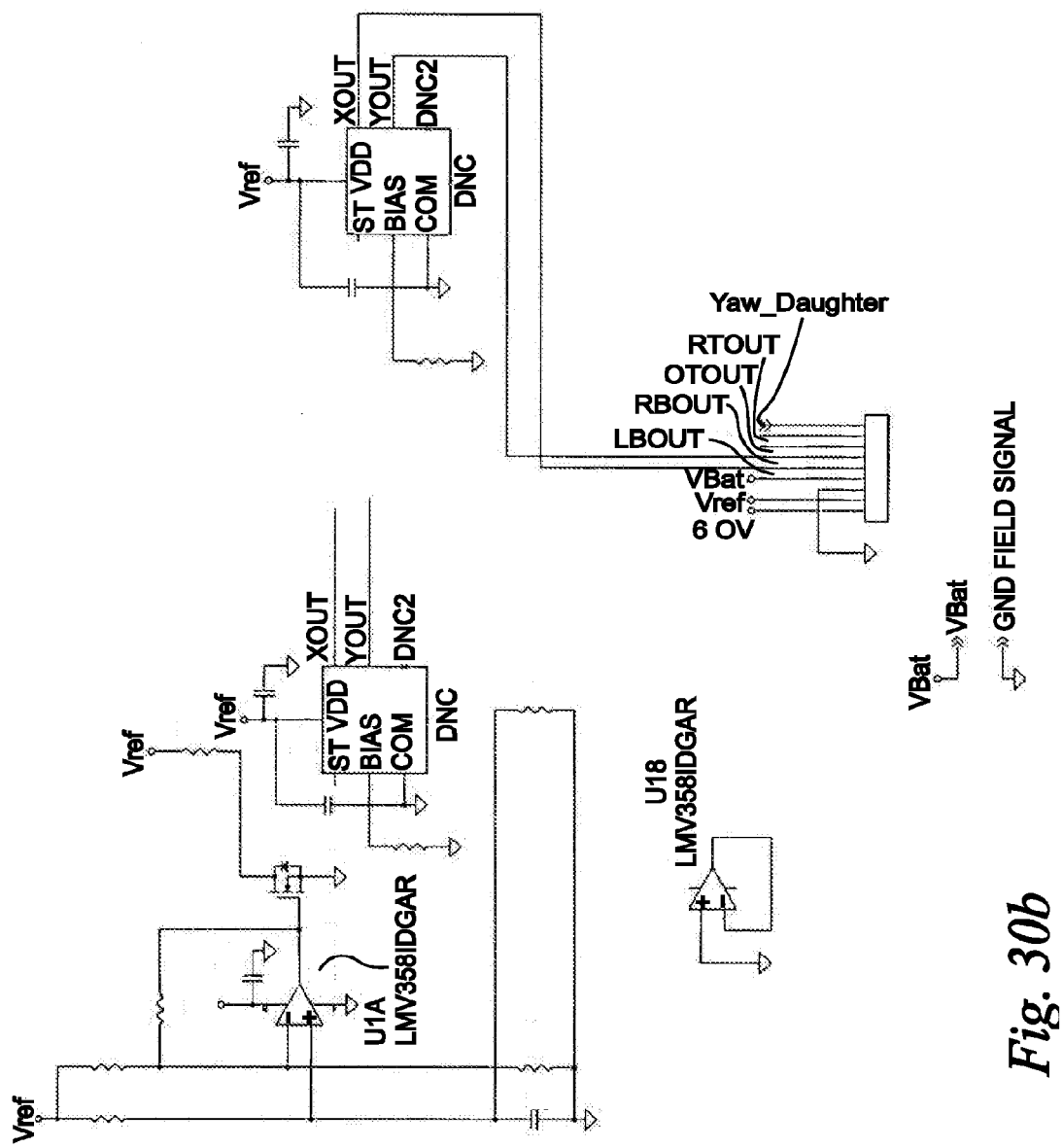
Figure 30C:
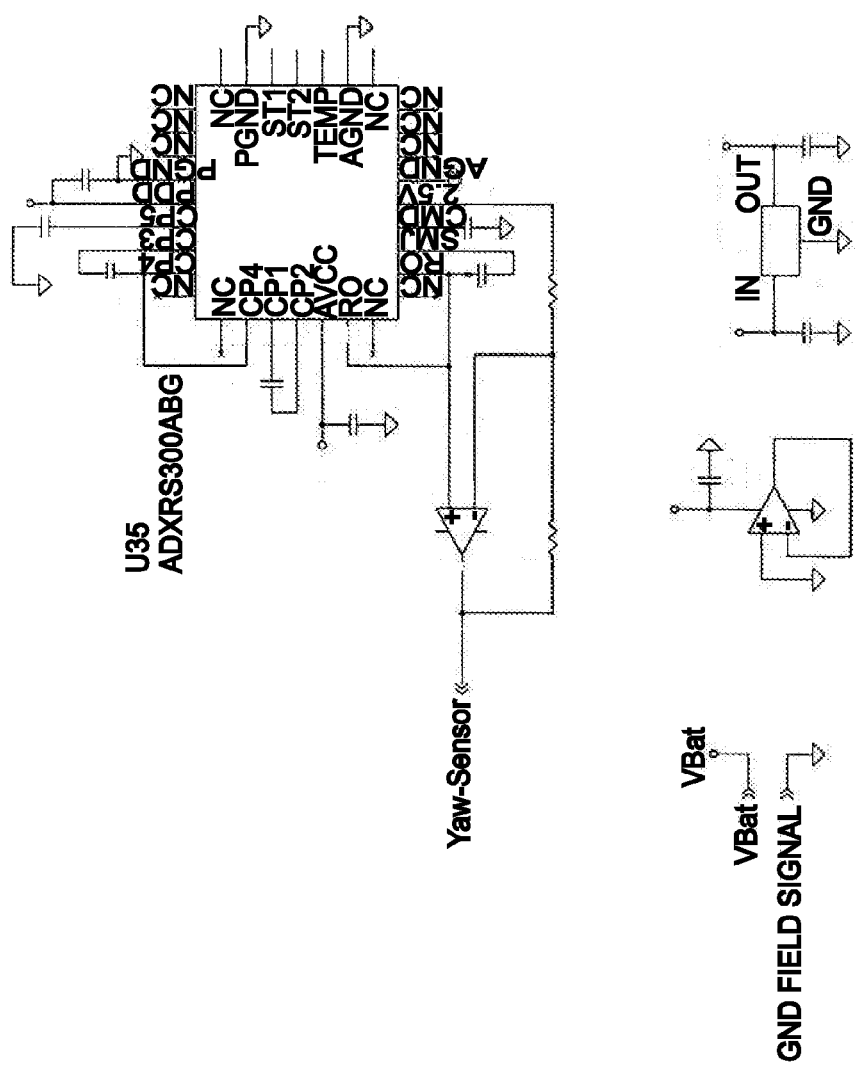
Figure 30D:
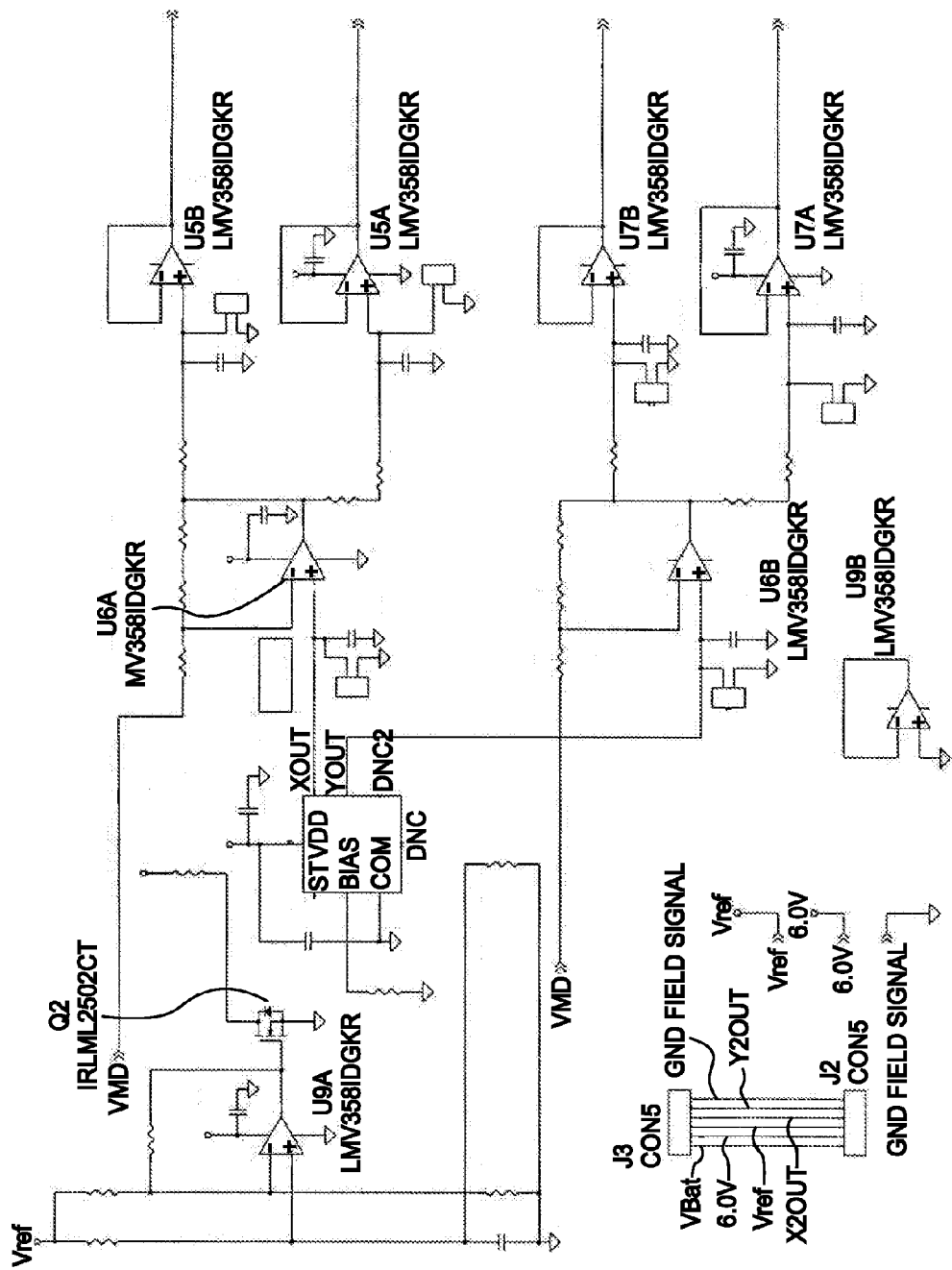
Figure 30E:
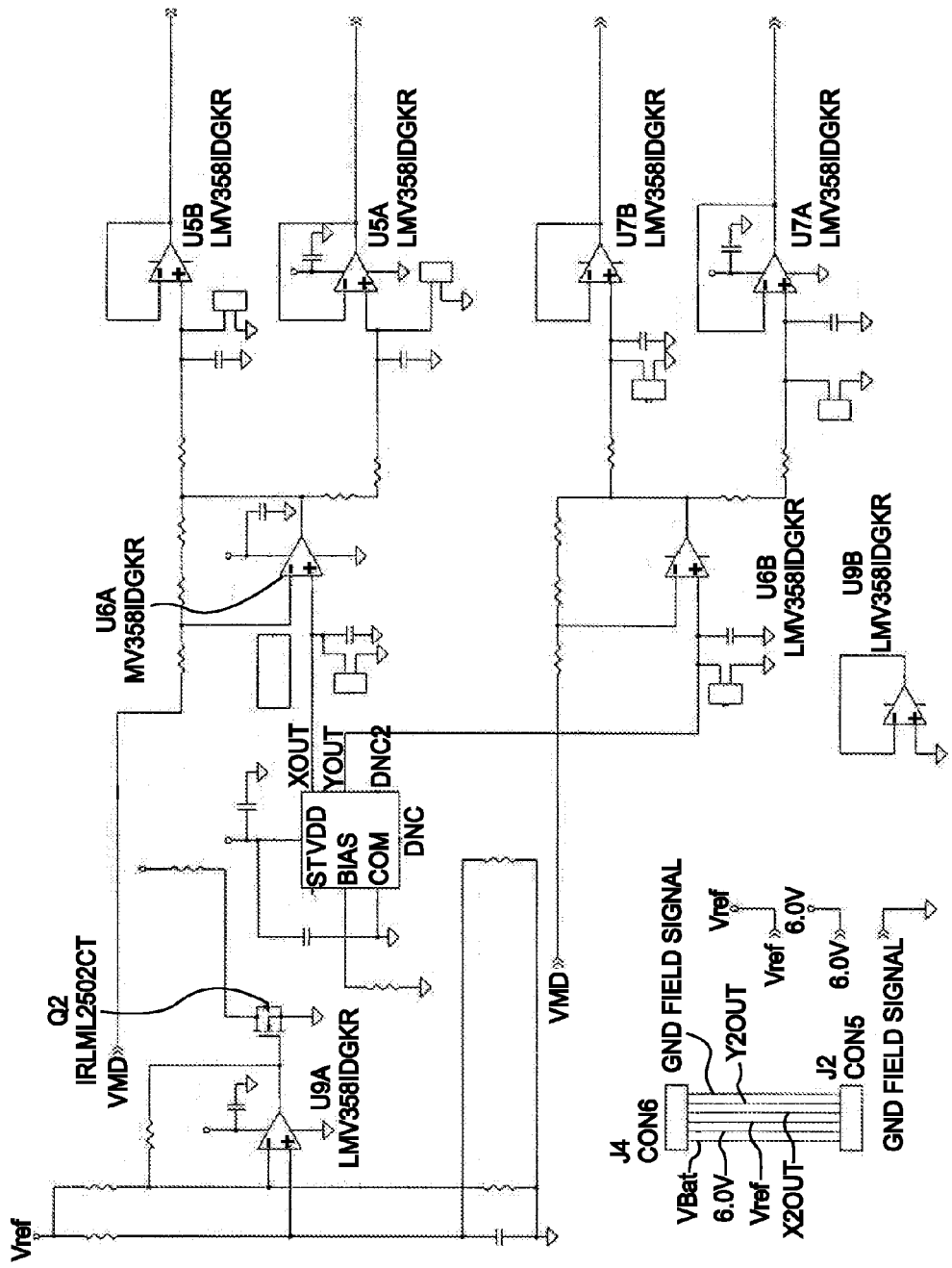
Figure 30F:
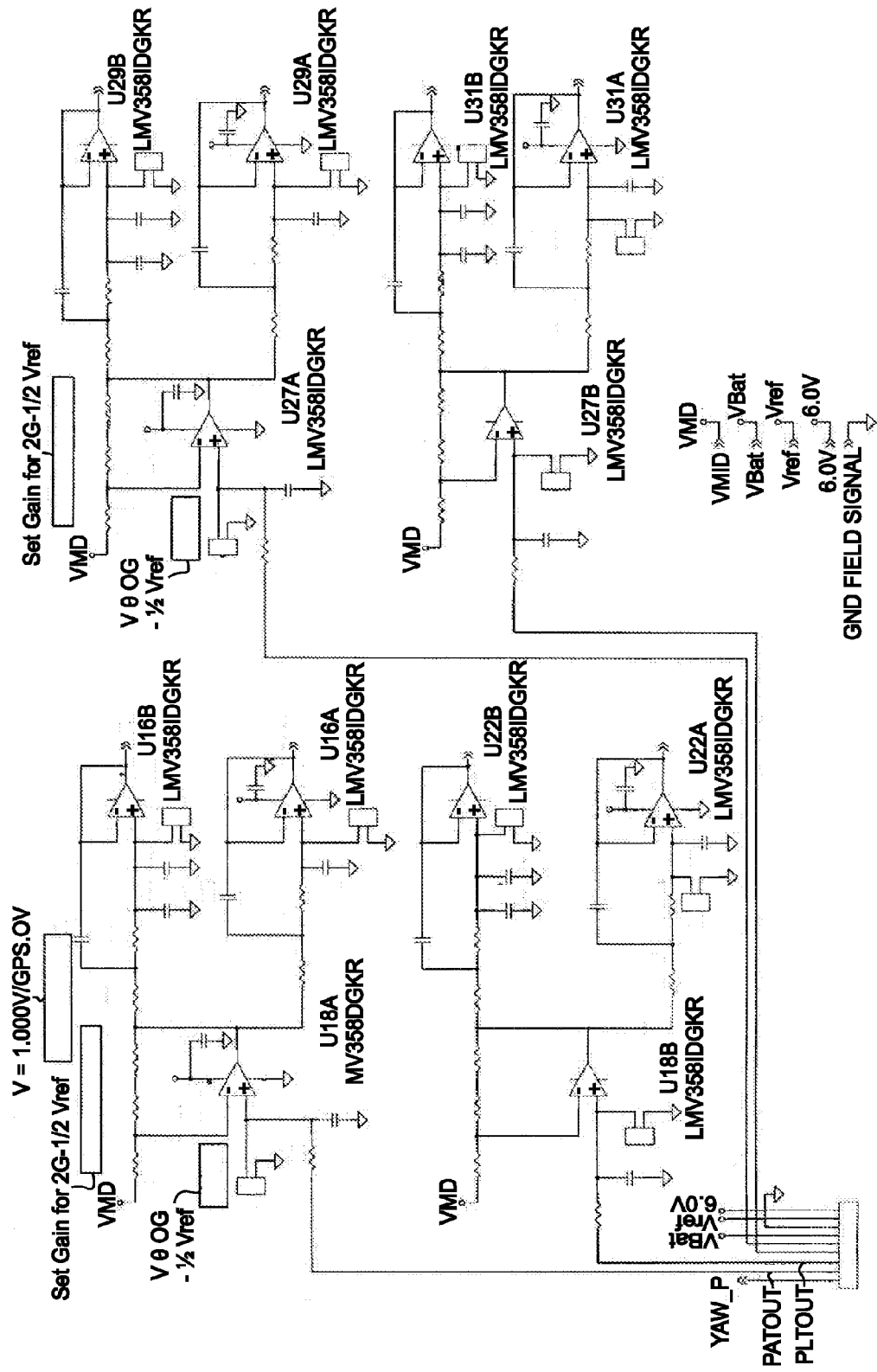
Figure 30G:
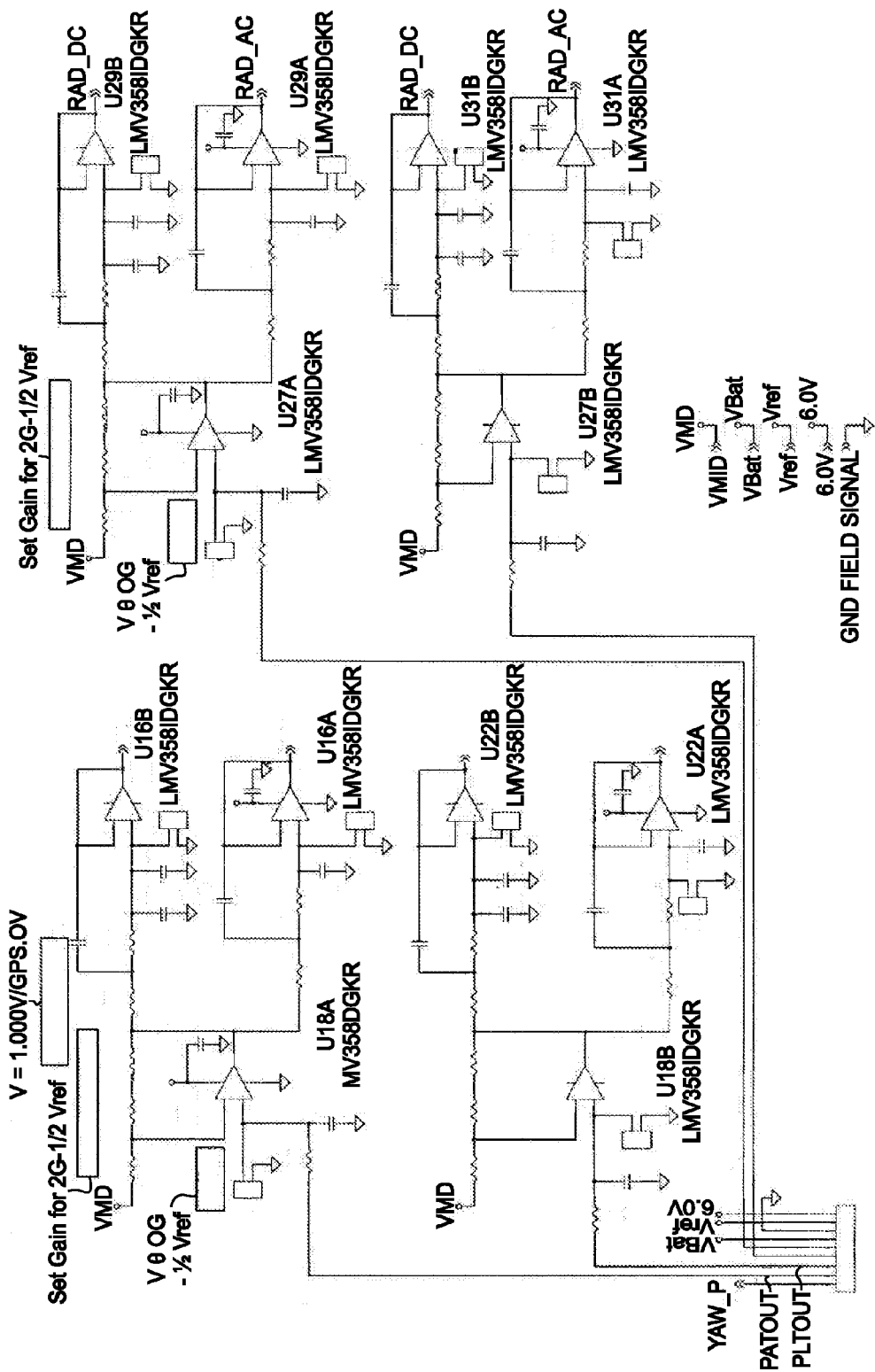
Figure 31:
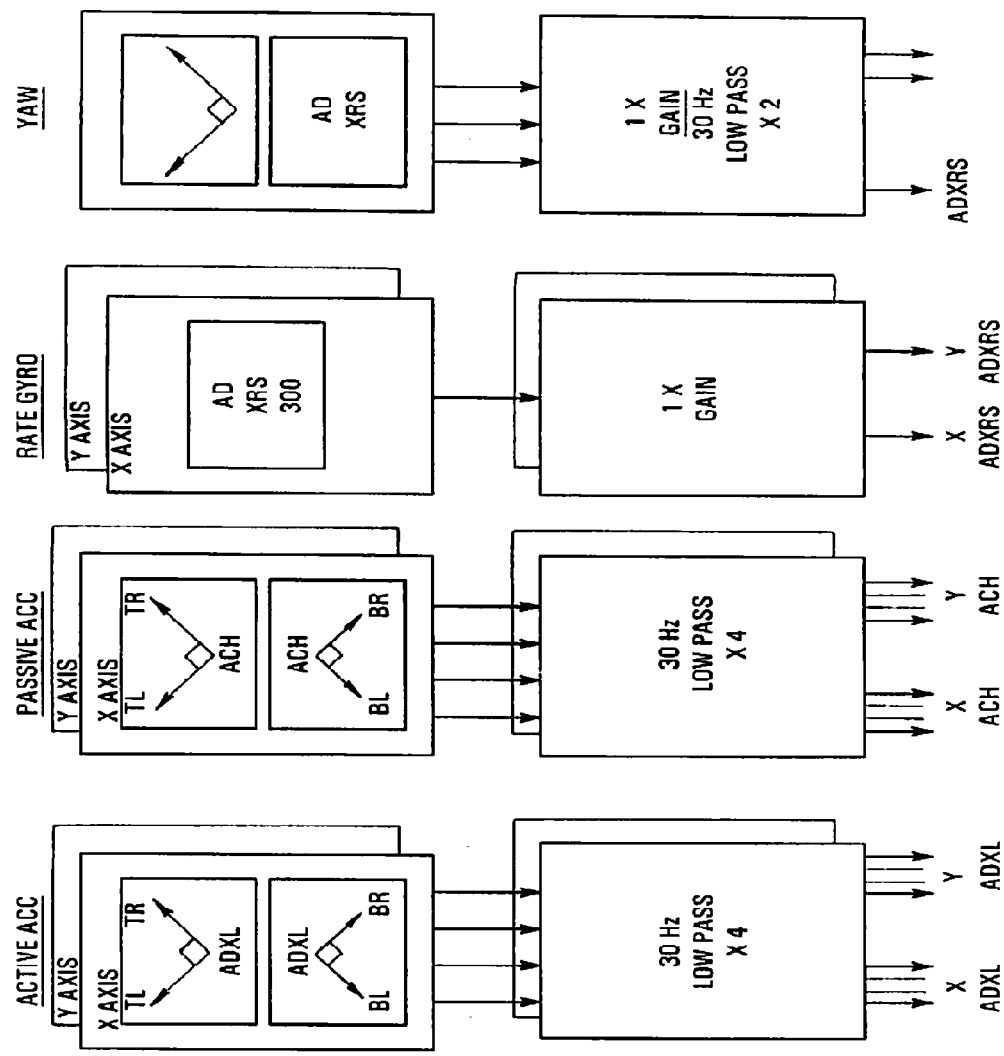
FIG. 31 is a detailed block diagram of an alternate embodiment of the homeostatic control system of FIG. 28.

The ducted fan assembly 214 is illustrated in FIGS. 23-27d. FIG. 23 is a cutaway view of one of the ducted fan assemblies 214 of the homeostatic flying hovercraft 200.

Each ducted fan assemblies 214 includes a motor mount 240 that is dimensioned to receive the motor 242. Each motor 242 is further comprised of an exterior rotating rotor 244 and an interior fixed stator 246 that is operably mountable in motor mount 240. A fan blade 248 is operably mounted on the exterior rotating rotor 244. The fan blades 248 are specially designed to make the most efficient use of the increased power provided by permanent magnet motors 242 while also reducing fan noise both because the blades 248 spin somewhat slower than conventional blades and because of the unique aerodynamic design features of the ducted fan blades.

There are at least six fan blades 248 extending from a central mounting hub 250 that is generally concentrically aligned with the motor mount 240 through an exterior ring 252. FIGS. 27a, 27b, 27c and 27d arc detail segment views of the fan blades 248. The fan blades 248 arc angled at a constant attack angle across a chord of each blade 248. In a first embodiment, the attack angle is greater than 20 degrees and less than 40 degrees.

Referring now to FIGS. 28-31, a preferred embodiment of the homeostatic control system 300 will be described. The homeostatic control system is operably connected to the thrusters to automatically control a thrust produced by each thruster in order to maintain a desired orientation of the saucer. The homeostatic control system includes an XYZ sensor arrangement 302 and associated control circuitry 304 that dynamically determines an inertial gravitational reference for use in automatic control of the thrust produced by each thruster. The control circuitry 304 is preferably implemented in software operating on signals from the XYZ sensor arrangement that have been converted into digital representation by an A/D input port of a microcontroller/microprocessor on which the software is executing. Alternatively, the control circuitry 304 may be implemented as hardware logic, software and processor logic, field programmable gate array (FPGA), application specific integrated circuit (ASIC), firmware or any combination thereof.

In this embodiment, the XYZ sensor arrangement comprises an X-axis sensor system, a Y-sensor system and a Z-axis sensor system. The X-axis sensor system is positioned in an X plane of the body and includes at least three first sensors that sense acceleration and gravity in the X plane and at least three second sensors that sense acceleration only in the X plane. The Y-axis sensor system is positioned in a Y plane of the body and includes at least three first sensors that sense acceleration and gravity in the Y plane and at least three second sensors that sense acceleration only in the Y plane. The Z-axis sensor system is positioned in a Z plane of the body and includes at least one sensor that senses yaw in the Z plane.

Preferably, the X-axis sensor system comprises two sets of active accelerometers and two sets of passive accelerometers oriented in the X plane. Similarly, the Y-axis sensor system comprises two sets of active accelerometers and two sets of passive accelerometers oriented in the Y plane. In this embodiment, each set of active accelerometers comprises a pair of active accelerometers oriented at 90 degrees with respect to each other in the respective plane and each set of passive accelerometers comprises a pair of passive accelerometers oriented at 90 degrees with respect to each other in the respective plane. Each of the pairs of active accelerometers and each of the pairs of passive accelerometers are positioned at 45 degrees offset relative to a horizontal plane through a center of the body. Although the preferred embodiment will be described with respect to four sensors per plane, it will be understood that increasing numbers of sensors per plane could be used to enhance the resolution and accuracy of the homeostatic control system.

In this embodiment, the control circuitry includes conditioning circuitry that independently conditions output signals from each accelerometer. The control circuitry also includes differential circuitry that independently operably subtracts output signals from the conditioning circuitry for the passive accelerometers from a corresponding output signal from the conditioning circuitry for the active accelerometers to generate a raw tilt value for each of four corresponding pairs of active and passive accelerometers in each of the X plane and the Y plane. The control circuitry further includes comparison circuitry that compares a ratio of two of the four corresponding pairs of active accelerometers and passive accelerometers with the other two of the four corresponding pairs of active accelerometers and passive accelerometers to determine a ratio of pairs of raw tilt values. An effective angle of an absolute position of the X-axis sensor system in the X plane is determined and an effective angle of an absolute position of the Y-axis sensor system in the Y plane is determined from the ratio of raw tilt values.

The control circuitry also includes accumulator circuitry that accumulates the effective angles over time from which an angular rate of change is determined for each of the X plane and the Y plane. A second differential circuitry operably subtracts the ratios of pairs of raw tilt values of each of the X plane and the Y plane from each of the corresponding output signals of the active accelerometers to generate a raw acceleration cross product vector for each of the active accelerometers. The control circuitry then uses processing circuitry that normalizes each of the raw acceleration cross product vectors for each of the active accelerometers in the X plane and the Y plane using the corresponding one of the effective angles for the X plane and the Y plane to generate a normalized cross product vector for each of the active accelerometers. Second comparison circuitry compares a ratio of the normalized cross product vectors of two of the four corresponding pairs of active accelerometers with the normalized cross product vectors of the other two of the four corresponding pairs of active accelerometers to determine a ratio of normalized cross product vectors. An effective magnitude of a true horizontal acceleration and a true vertical acceleration of the X-axis sensor system in the X plane is determined from this ratio of normalized cross product vector. Similarly, an effective magnitude of a true horizontal acceleration and a true vertical acceleration of the Y-axis sensor system in the Y plane is determined from this ratio of normalized cross product vector.

The detailed circuit schematic set forth in FIGS. 30a-30g detail to a person skilled in the art the implementation of one embodiment of the homeostatic control system.

Figure 1:
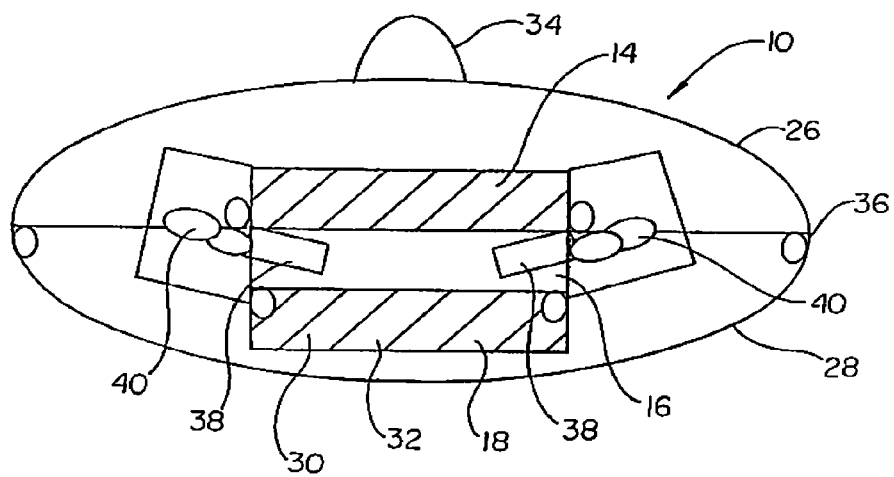
FIG. 1 is a cross-sectional side view of the craft in accordance with one embodiment of the present invention.
Figure 2:
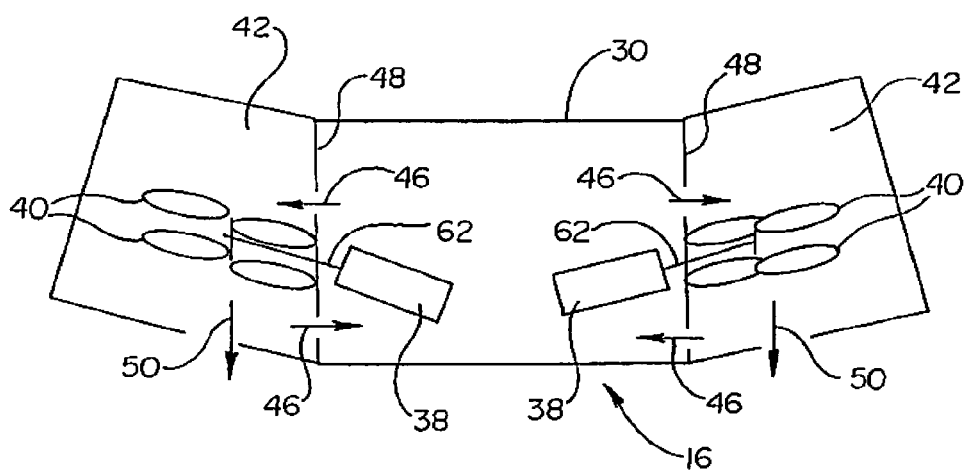
FIG. 2 is a detailed cross-sectional view of the fan rotation of the embodiment of FIG. 1.
Figure 3:
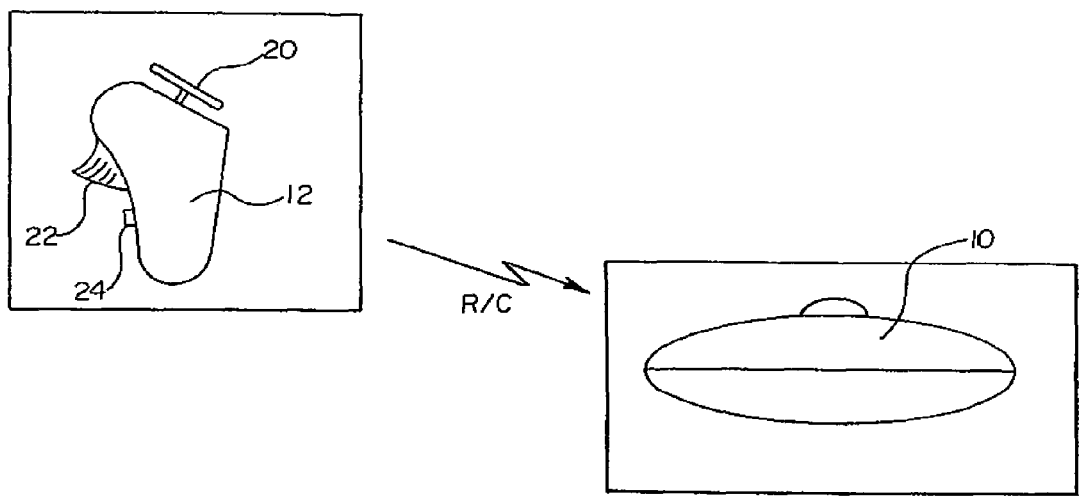
FIG. 3 is a schematic diagram of the remote controller and the craft of the embodiment of FIG. 1.

Referring now to FIGS. 1-3, an overall view of another embodiment of the present invention of a radio controlled flying hovercraft 10 and the remote controller 12 is shown. Preferably, the hovercraft 10 is of a modular design, with all of the avionics 14, propulsion 16 and power components 18 being easily replaceable. The remote controller 12 is preferably provided with a thumb-activated throttle and yaw control 20 and one or more finger operated trigger controls 22 and 24. It is further envisioned that remote controller 12 may incorporate force feedback and/or visual gauges.

As illustrated in FIG. 1, the hovercraft 10 is an ellipsoid comprised of an upper surface 26 and lower surface 28. Both upper surface 26 and lower surface 28 are made of Nerf®-like foam material in a preferred embodiment. Alternatively, the body/shell may be made of Styrofoam, arcel, carbon fiber, Kevlar®, plastic or the like.

A central housing 30 is disposed within hovercraft 10. The central housing 30 contains the avionics module 14 and propulsion module 16 modules. In the preferred embodiment, the central housing 30 includes battery pack 32 in the form of rechargeable nickel metal hydride cells. Alternatively, power and even control signals can be provided to the craft via a tether cable (not shown).

In one embodiment, the hovercraft 10 is provided with a laser emitter and detector 34 for playing laser tag. LEDs 36 are disposed about the circumference to indicate that the craft has been hit. In alternate embodiments, speakers may also be used. Numerous variations in the tag game can be effected, such as having the craft 10 reduce power and/or stability in response to a hit, exercise a wobble routine in response to a hit, be deactivated after a certain number of hits and automatically land, respond in relation to the relative accuracy of the hit, or even allow for recharging at a base station.

As illustrated in FIG. 2, the propulsion module 16 is disposed within the central housing 30. The propulsion module 16 is comprised of four motors 38 operably connected to four matching fans 40 each within a separate duct 42. The ducted fans 40 are preferably tilted between 10-15 degrees relative to the lower surface 28 of the hovercraft 10 to provide a counter-balanced stabilization effect. A circular airflow is also preferably established between the ducts 42 and the motor housing 44 by way of ventilation passages 46. The ventilation passages 46 are a plurality of openings located along the common wall 48 adjacent to duct 42 and motor housing 44. The ventilation passages are located upstream and downstream of the fans 40 so as to induce circulation through the motor housing 44 and around the motors 38 for cooling. However, the majority of the airflow generated by fans 40 is driven through the downstream opening 50 of each duct 42.

FIG. 3 shows a preferred embodiment of a remote controller 12 that provides one-handed control operation with pitch and roll control accomplished by mimicking the pitch and roll of the craft 10 through the use of XY axis transducers in the remote controller 12. For example, the rotation of the operator's hand will result in a comparable rotation of the hovercraft 10. It is envisioned that the remote controller 12 contains batteries, an antenna, and an optional vibration system to signify laser strikes and/or out-of-range operation of the hovercraft 10.

In this embodiment, a 2 digital channel bi-directional controller 12 is preferably used with a transceiver in both the controller and the craft. Preferably, the transceiver operates in the 900-Mhz band, although operation at the 72 Mhz or 400 Mhz bands is also possible. One channel is for digital transmit, the other channel is for digital receive. Preferably, transmissions are done in word packets using 9 bit bytes (8 bits data, 1 bit parity). In one embodiment, a four byte preamble (alternating bytes of 0's and 1's) and four byte post-amble (alternating bytes of 0's and 1's) precede and follow a predetermined length data packet portion of the word packet. The use of a 2 digital channel bi-directional radio frequency (RF) communication scheme permits multi-users to be designated on the same RC channels by using unique ID codes within a header of the data packet portion for a given combination of controller and craft.

Figure 4A:
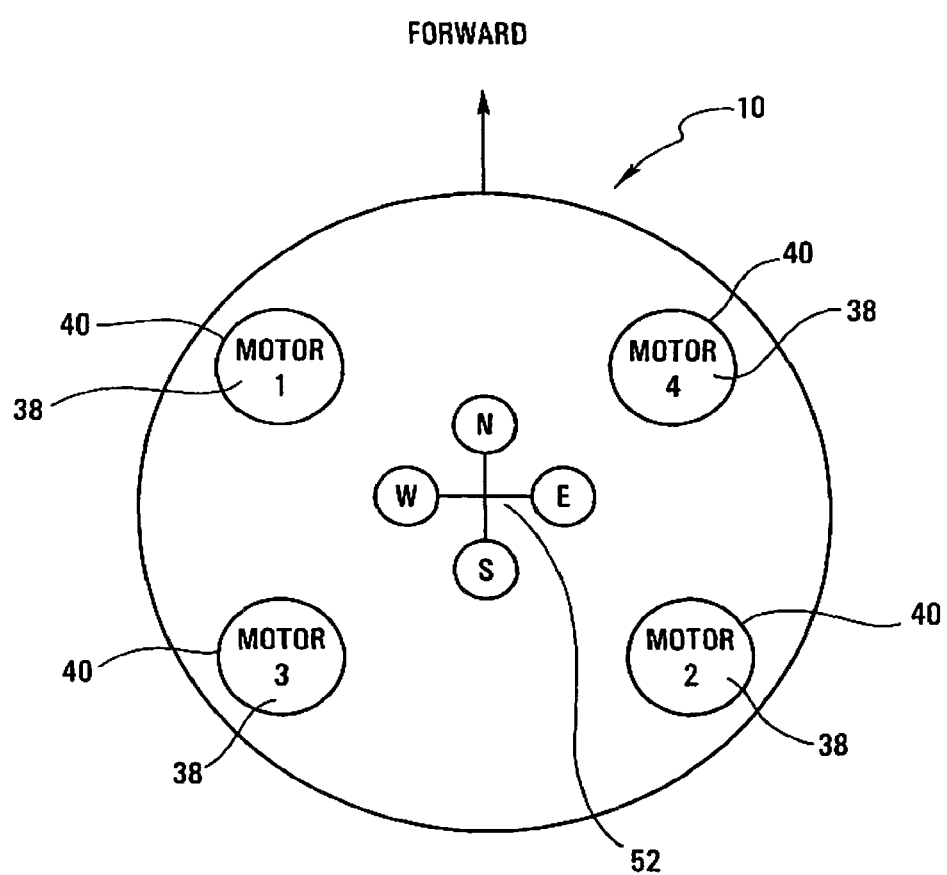
FIG. 4a is a schematic diagram of a general configuration of 4 lift motor/ducted fans and an XY axis mercury tilt switch stabilizer transducer of the embodiment of FIG. 1.
Figure 4B:
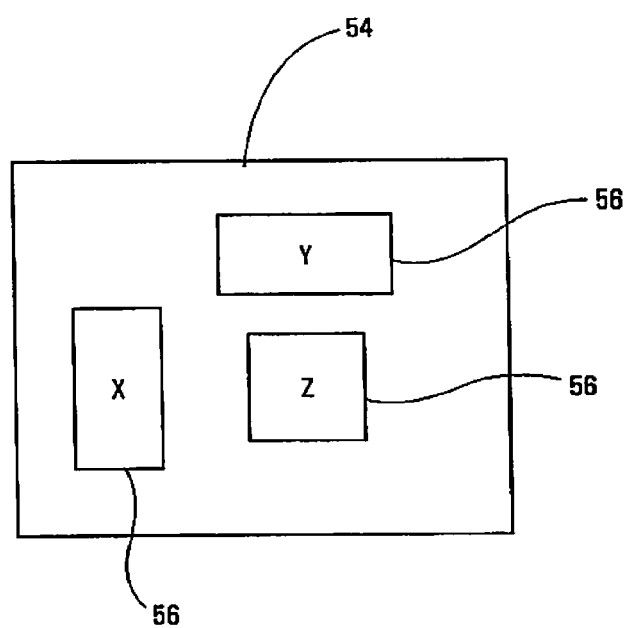
FIG. 4b is a schematic diagram of XYZ axis piezoelectric gyros of the embodiment of FIG. 1.

As illustrated in FIG. 4a, the four lift motors 38 and ducted fans 40 are configured symmetrically about the XY axis. Disposed centrally to the four lift motors 38 and ducted fans 40 are the XY axis mercury tilt switch stabilizer transducers 52 of this embodiment. FIG. 4b illustrates the arrangement of the positioning system 54 comprised of XYZ axis piezo gyros 56 also contained within central housing 30. Each of the three gyros 56 provides angular rate information on the respective x, y and z plane.

Figure 5:
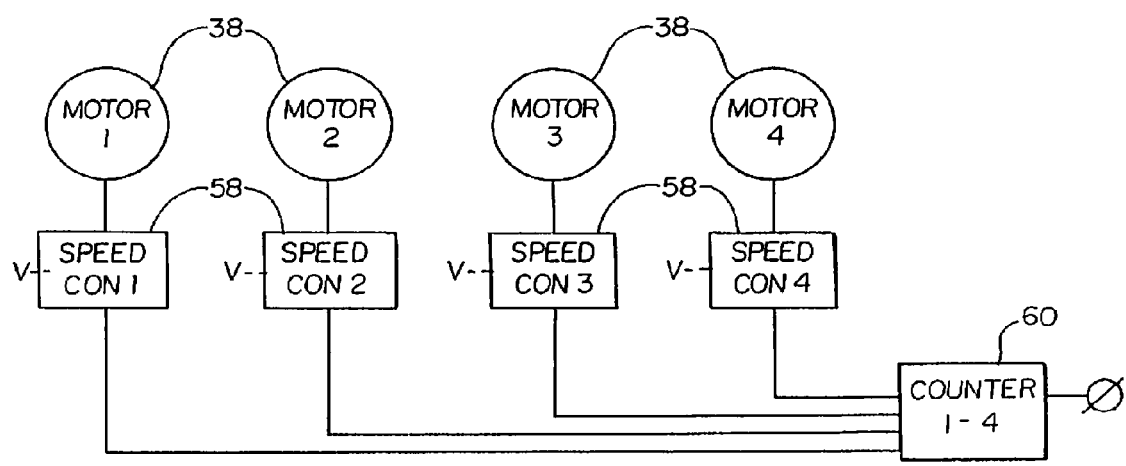
FIG. 5 is a schematic diagram of a general configuration of 4 motors, speed controllers and motor enable counter of the embodiment of FIG. 1.
Figure 6:
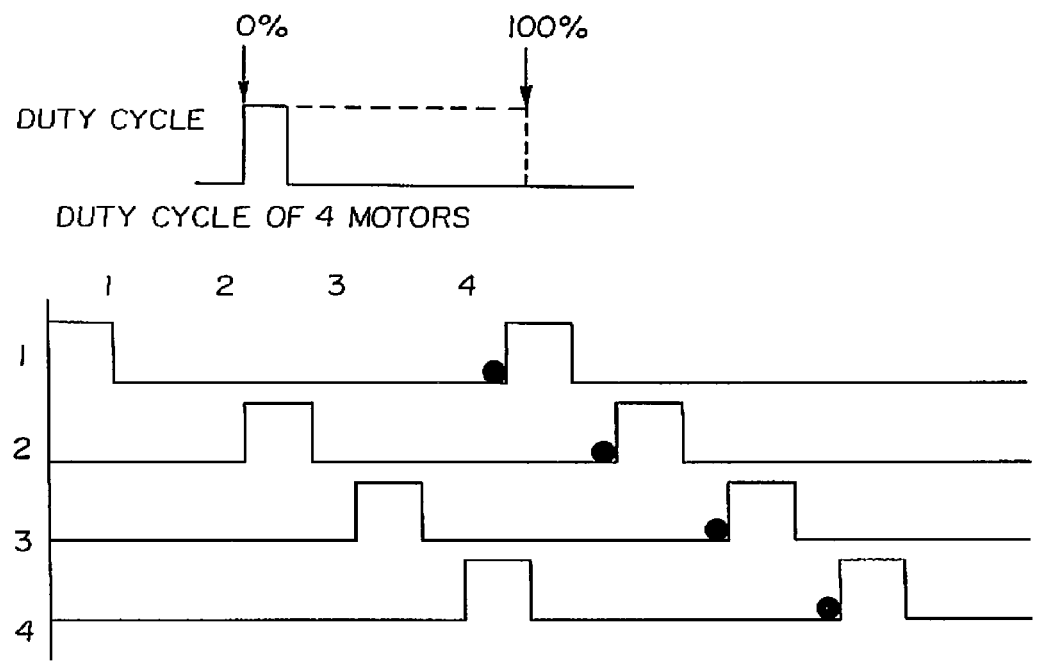
FIG. 6 is a timing diagram of a general duty cycle for operating the speed controllers and motor enable counter of FIG. 5.

As illustrated in FIG. 5, the four motors 38 are individually connected to a motor speed control 58. Each motor speed control 58 is operably connected to a common motor enable counter 60. In a preferred embodiment, the hovercraft 10 is preferably overpowered for normal flight by a lift-to-weight ratio of at least 2:1 and preferably 4:1. This allows the hovercraft 10 to avoid overheating of the four motors 38 and to maximize power and thrust. As illustrated in FIG. 6, the switching frequency of the duty cycle is optimized for moment of inertia of the ducted fans 40. Each motor 38 has a duty cycle staggered relative to the other three motors 38.

In an alternate embodiment that provides for more efficiency, each of the ducted fans 40 has two counter-rotating multi-bladed units. A shaft drive 62 connects the fans to four electric motors 38 mounted within a central housing 30 in the middle of the hovercraft 10. Preferably, the central housing 30 is provided with EMF shielding around the motors 38. Since the motor units 38 are overpowered per lift-to-weight ratios, the motors 38 are rotated to maximize cooling and maximize power drain on the battery 32.

Figure 7:
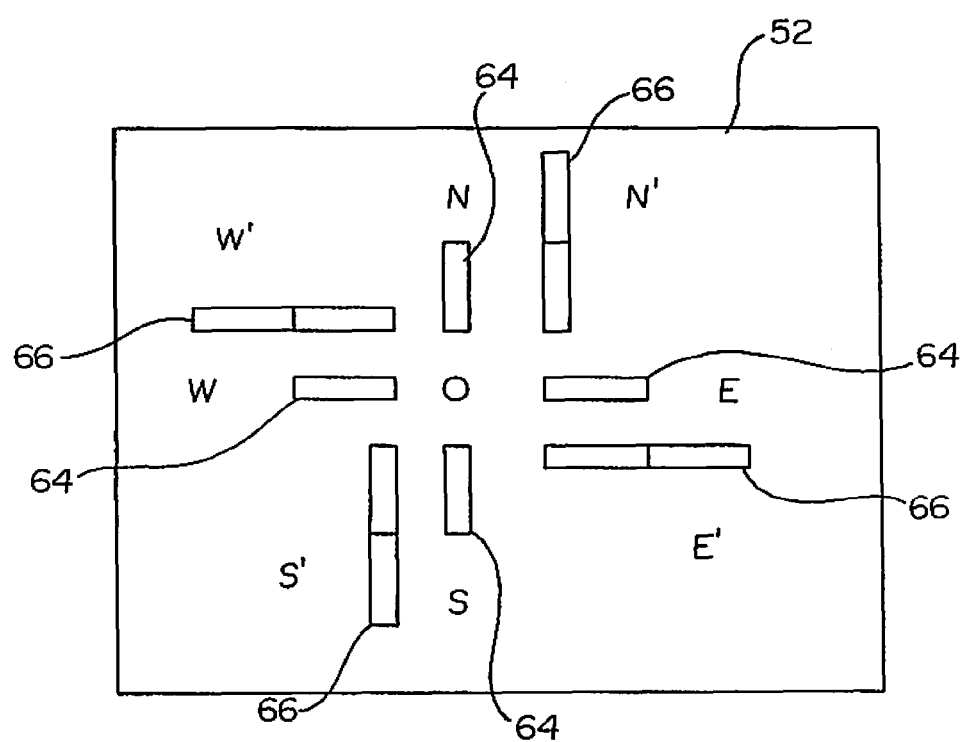
FIG. 7 is a top view of a general configuration of the XY axis tilt switch stabilized transducer of the embodiment of FIG. 1.

As shown in FIG. 7, the XY axis tilt switch stabilizer 52 is a fluid suspended tilt switch mechanism. The NSEW transducers 64 represent zero degrees in the XY axis horizontal plane. The transducers 64 are at a (1-3 degree) offset from the set angle. The pairing of the transducers in one plane increases response time and reduces bounce effect of the tilt switch mechanism 52. Preferably, a simple debouncing circuit accompanies each switch. N'S'E'W' transducers 66 are set to (5-10 degrees) offset from the zero point to establish predetermined orientations for fly-by-wire XY axis pitch/roll control. It will be recognized that multiple degree sensors could be used to establish a plurality of different fly-by-wire preset orientations. It will also be understood that a variety of different tilt switch or gravity sensors could be used to accomplish a similar effect.

Figure 8:
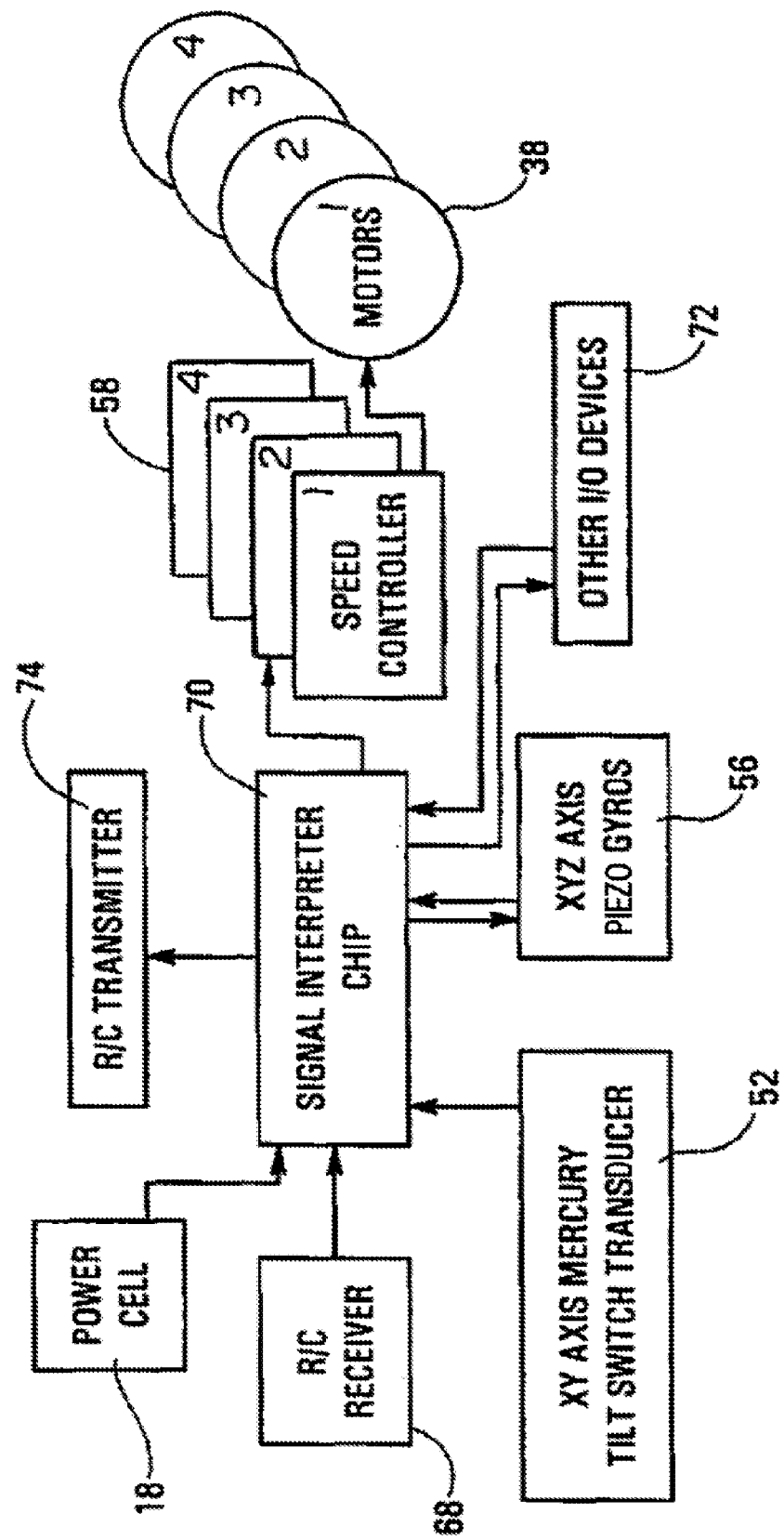
FIG. 8 is a block diagram of the systems of the embodiment of FIG. 1.

FIG. 8 illustrates a block diagram detailing operation onboard the hovercraft 10 of one embodiment of the present invention. A signal interpreter chip 70, powered by power unit 18 receives inputs from the radio control (R/C) receiver 68 as to directional commands. The R/C receiver 68 is a digital unit capable of receiving the following commands—up, down, yaw left, yaw right, pitch up, pitch down, roll left, roll right, fire laser, engage shields, and other directional and/or operational commands. To implement the commands, signal interpreter chip 70 communicates with XY axis mercury tilt switch transducer 52, XYZ piezo gyros 56 and any other I/O devices 72. Once stability and heading are determined by the signal interpreter chip 70, the motors 38 are engaged by way of speed controllers 58. Feedback on position is submitted to the remote control unit 12 through R/C transmitter 74.

Figure 9:
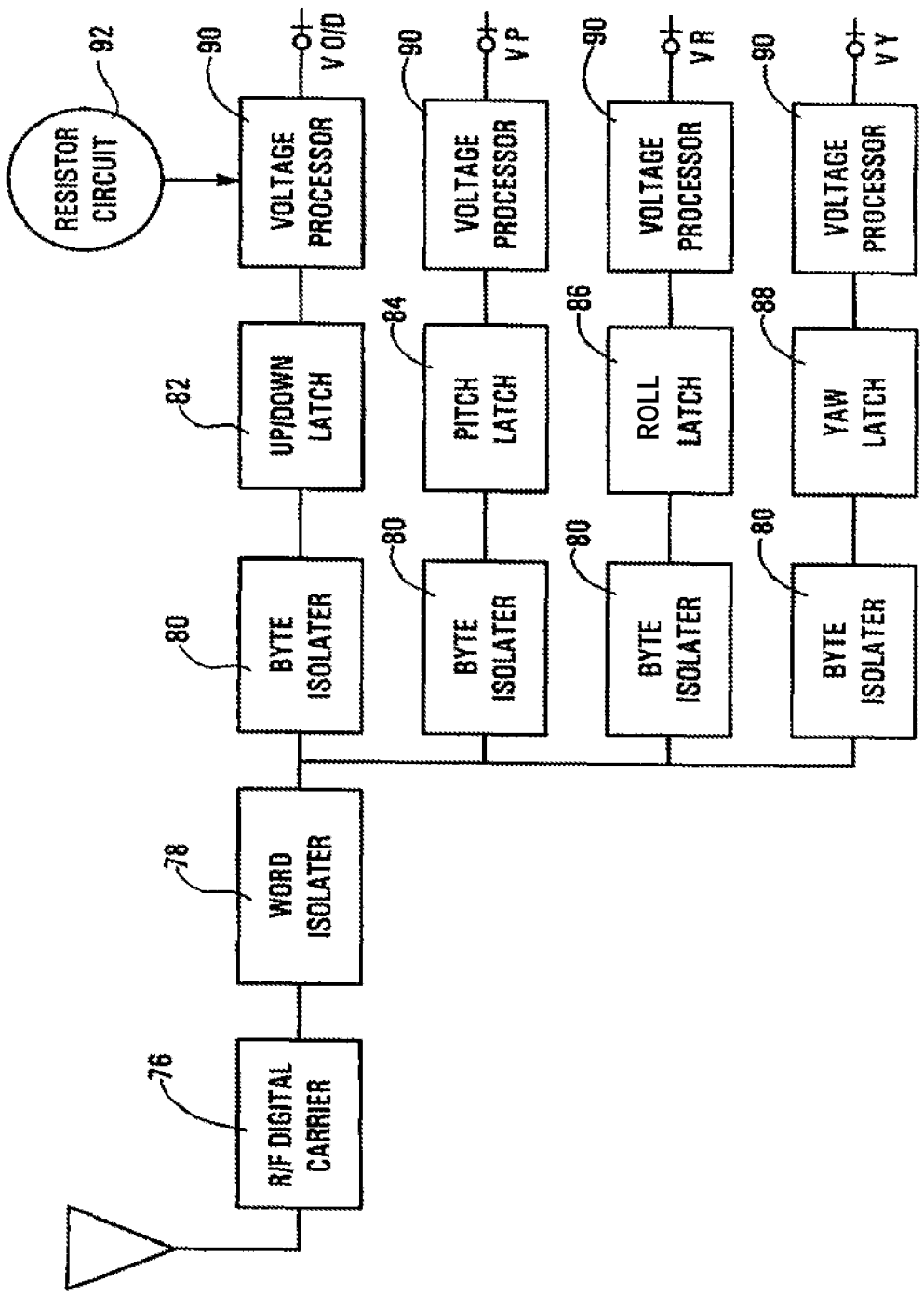
FIG. 9 is a block diagram of the avionics of the embodiment of FIG. 1.

FIG. 9 is a block diagram illustrating the avionics command system. Radio frequency (R/F) digital carrier signal 76 is decomposed by word isolator 78 into words and then into smaller information packages by byte isolators 80. The byte packages are then segregated as up/down 82, pitch 84, roll, 86 and yaw 88. The command is converted by the respective voltage processor 90 and resistor circuit 92, for creation of an appropriate up/down, pitch, roll or yaw velocity vectors.

Figure 10:
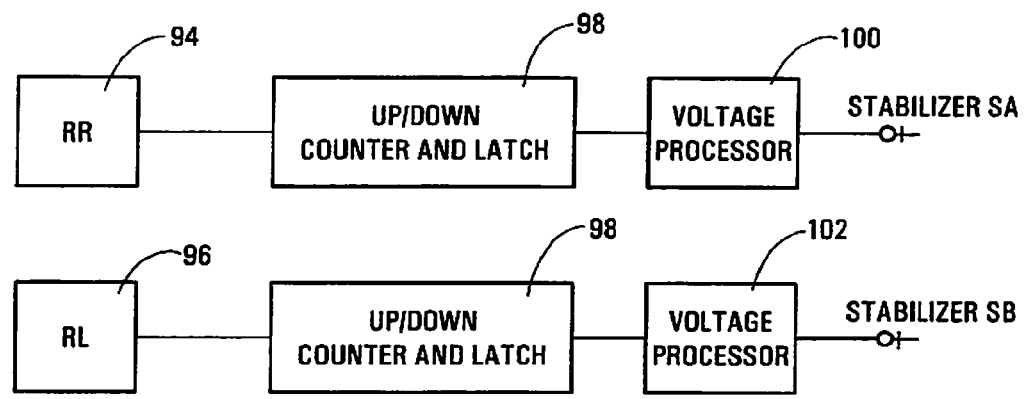
FIG. 10 is a schematic diagram of a general configuration of an XY axis tilt switch stabilized transducer circuit of the embodiment of FIG. 1.

FIG. 10 shows a general configuration of the XY axis mercury tilt switch stabilizer transducer circuit 52 in this embodiment. Roll right (RR) 94 and roll left (RL) 96 are measured by circuit 52. A counter roll 98 is calculated and converted to the appropriate voltage command 100 and 102. A similar circuit is used for N'S'E'W' fly-by-wire roll/pitch settings.

Figure 11:
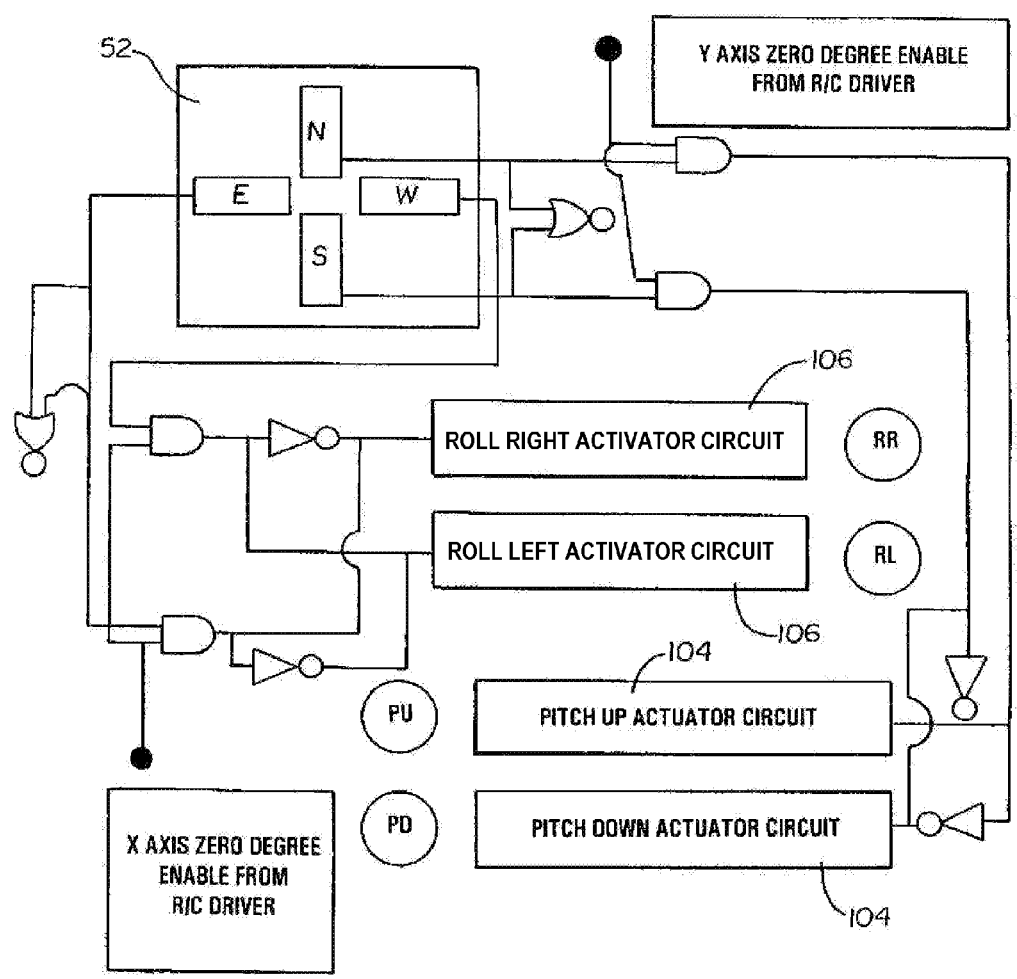
FIG. 11 is a schematic diagram of the homeostatic stabilizer circuit of the embodiment of FIG. 1.

FIG. 11 depicts a first embodiment of the stabilizer circuit for the hovercraft 10. The XY axis mercury tilt switch stabilizer transducers 52 are linked electrically to the appropriate circuit for roll and pitch correction. For example, the N and S transducers 64 provide status information with regard to pitch actuation 104 while the E and W transducers 64 provide status information with regard to roll actuation 106.

Figure 12:
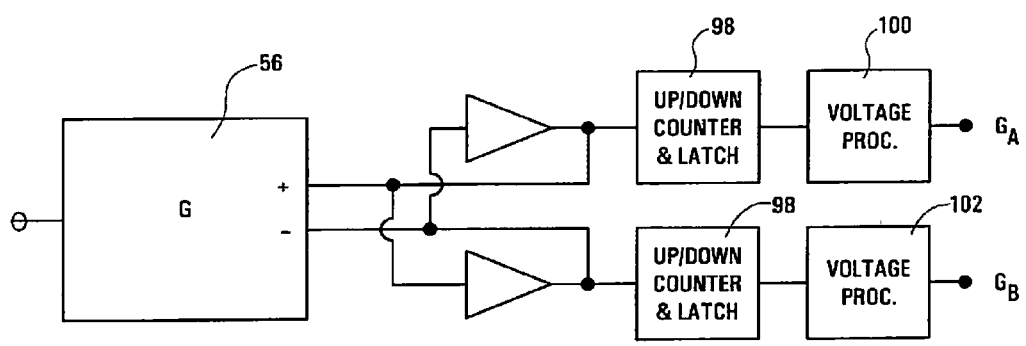
FIG. 12 is a schematic diagram of the piezoelectric gyro output for the embodiment of FIG. 1.
Figure 13:
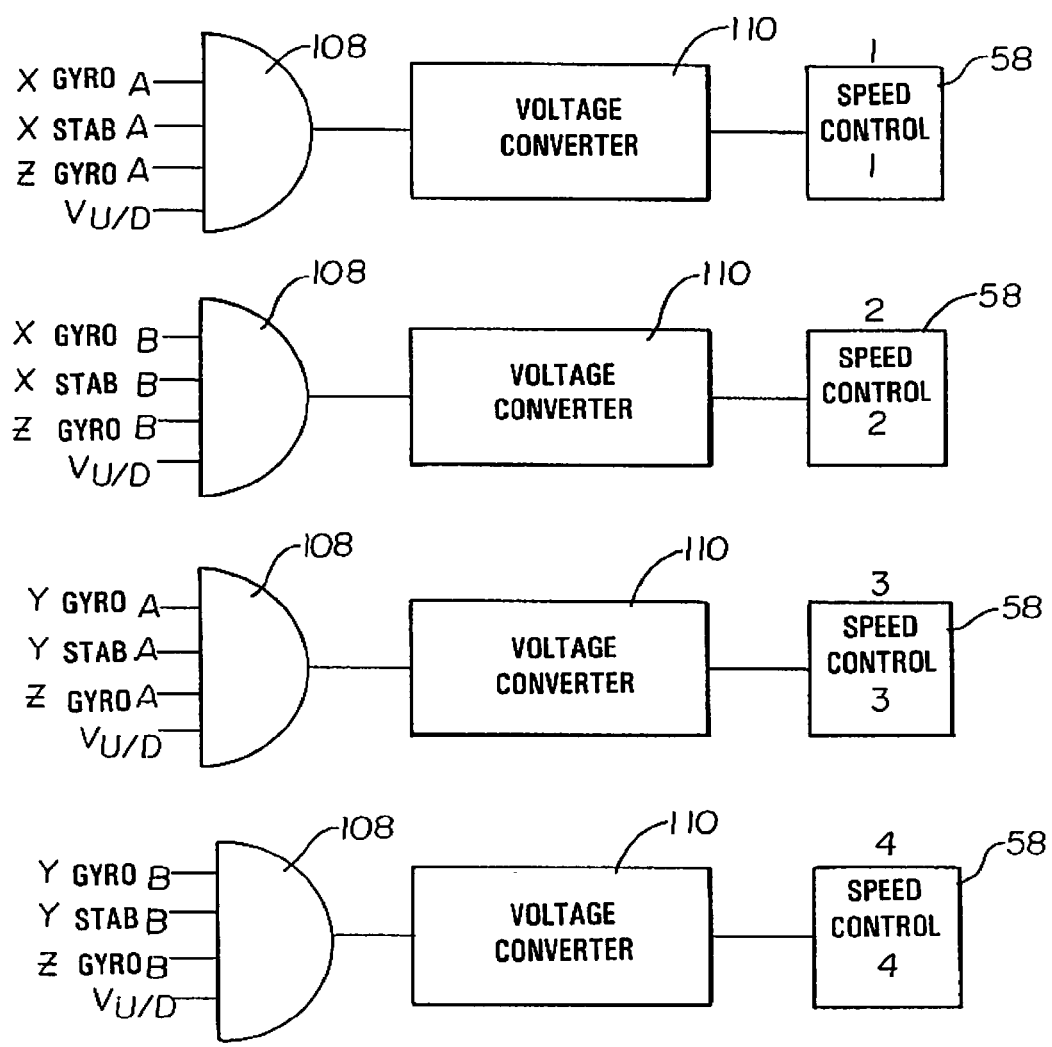
FIG. 13 is schematic diagram of the control system for the motor controllers incorporating the outputs of the stabilizer circuits and the gyro circuit of the embodiment of FIG. 1.
Figure 14:
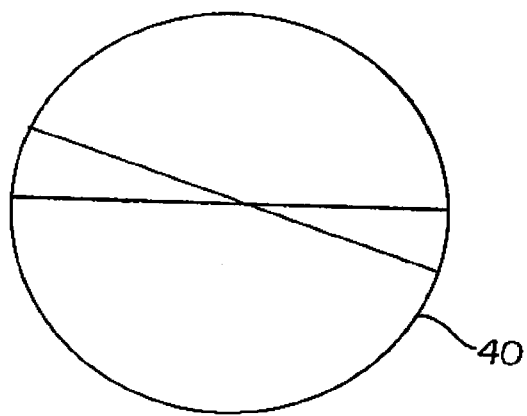
FIGS. 14 and 15 are top views of alternate embodiments of the ducted fan blades.
Figure 15:
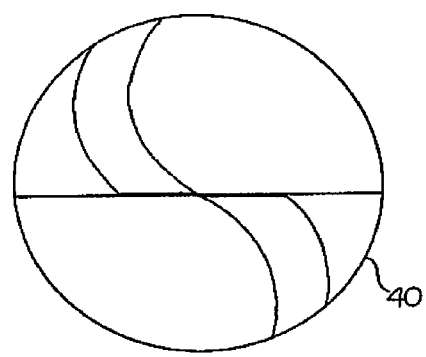
Figure 16:
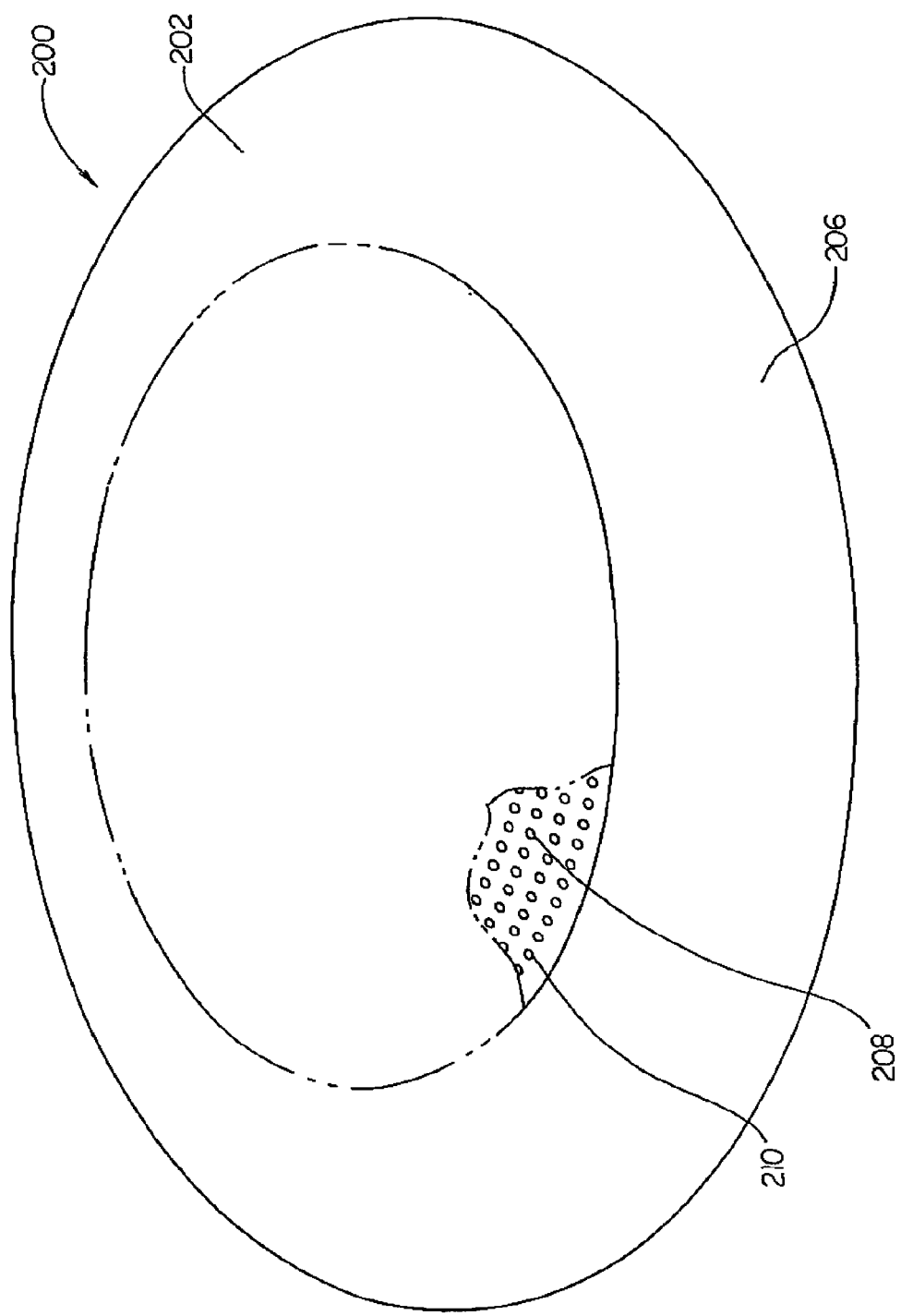
FIG. 16 is an isometric view of a preferred embodiment of a homeostatic flying hovercraft in accordance with the present invention.

FIG. 12 shows a block diagram for enable from the X stabilizer circuit or the Y stabilizer circuit to the piezo gyros 56. FIG. 13 shows a schematic diagram of the control system for the motor controllers 58 incorporating the outputs of the stabilizer circuits 52 and the gyro circuits 56. For example, voltage adder 108 computes inputs from $X_{gyro\ A}$, $X_{stab\ A}$, $Z_{gyro\ A}$, and $V_{u/d}$. Voltage to frequency converters 110 made up of a 555 timer/op amp circuits convert the combined voltage to a frequency for the respective motor speed controllers 58. FIGS. 14-15 show alternate embodiments of the ducted fan blades 40.

In operation, a fly-by-wire signal is sent to the hovercraft 10. NSEW transducers 64 are sensed and the motors 38 are powered accordingly for the hovercraft 10 to reach zero degrees XY axis. When this point is established, XYZ axis piezo gyros 56 lock on and stabilize the craft 10. If XY axis drift occurs, the NSEW transducers 64 reengage the process, thereby providing true homeostatic hover control feedback. The remote controller 12 provides digitized command signals which are received by receiver 68. The signal interpreter chip 70 converts the signal to the appropriate directional and operational command.

While there have been shown in the drawings and described what are present to be preferred embodiments of the present invention, it is understood by one skilled in the art that changes in the structures, arrangement of structures, materials, electronic controls and programs and methods can be made without departing from the invention. Other variations, applications and ramifications of the invention within the skill of a person in the art are included in the present specification and the following claims.

What is claimed is:

1. A radio controlled (RC) system for a homeostatic flying craft controllable by a user remote from the flying craft with a hand-held controller, the hand-held controller housing a battery-powered microprocessor system operatively coupled to a sensor system, the RC system comprising:
a flying structure having lift generated by four electrically powered motors, each motor having at least one blade driven by the motor that generates a downwardly directed thrust, the flying structure including:
a homeostatic control system operably connected to the motors and configured to control the thrust produced by each motor in order to automatically maintain a desired orientation of the flying structure, the homeostatic control system including at least a three-dimensional sensor system and associated control circuitry configured to determine an inertial gravitational reference for use by the homeostatic control system to control a speed of each of the motors;
a radio frequency (RF) transceiver operably connected to the homeostatic control system and configured to provide RF communications with the hand-held controller; and
a battery system operably coupled to the motors, the RF transceiver and the homeostatic control system; and
control software that is adapted to be used by the battery-powered microprocessor system in the hand-held controller and that is configured to control the flying structure by RF communications that include control commands corresponding to the desired orientation of the flying structure based on the sensor system in the hand-held controller that is configured to sense a controller gravitational reference and a relative tilt of the hand-held controller with respect to the controller gravitational reference as a result of the user selectively orienting the hand-held controller.

2. The RC system of claim 1 wherein the RF communications between the flying structure and the hand-held controller selectively include data transmissions in addition to the control commands, wherein the data transmissions are selectively configured to include video images from the flying structure, and wherein software updates are configured to be received by the hand-held controller from an Internet connection.

3. The RC system of claim 1 further comprising instructions configured to keep the flying structure within 500 feet of the hand-held controller.

4. The RC system of claim 1 wherein the sensor system includes both a first set of sensors and a second set of sensors, and wherein the homeostatic control system is configured to determine a passively measured orientation of the flying craft relative to the inertial gravitational reference that is initially measured and periodically updated using the first set of sensors, and an actively updated orientation of the flying craft relative to the inertial gravitational reference using the second set of sensors, and to use a difference between the passively measured orientation and the actively updated orientation to improve determination of craft orientation.

5. The RC system of claim 1 wherein the sensor system includes both a three-dimensional accelerometer sensor system and a three-dimensional gyroscopic sensor system.

6. The RC system of claim 1 wherein the four motors are arranged as two pairs of motors that are symmetrically positioned about an X-Y axis configuration such that one motor of each pair of motors is positioned opposite the other motor and one of the pairs of motors is configured to counter-rotate relative to the other of the pairs of motors, and wherein the flying structure weighs less than 42 ounces.

7. A radio controlled (RC) drone controlled by a user operating a hand-held RC controller separate and remote from the RC drone comprising:
a body supporting two pairs of electrically powered motors, each motor configured to drive at least one blade to generate aerodynamic lift;
a battery system positioned in the body and operably coupled to the motors;
a control system positioned in the body and operably connected to the motors and the battery system, the control system configured to control a downwardly directed thrust produced by each motor using:
a radio frequency (RF) transceiver configured to facilitate RF communications with the RC controller that include commands corresponding to a desired orientation of the RC drone;
a sensor system configured to sense a sensed orientation of the body; and
a microprocessor system configured to determine a gravitational reference and to use the sensed orientation and the gravitational reference to control a speed of each of the motors to position the body in response to the commands corresponding to the desired orientation; and software that is adapted to be used by a battery-powered microprocessor system in the RC controller and that is configured to control the RC drone by RF communications that include control commands corresponding to the desired orientation of the RC drone based on a sensor system housed in a hand-held structure of the RC controller that is configured to sense a gravitational reference and a relative tilt of the hand-held structure with respect to the gravitational reference as a result of the user selectively orienting the hand-held structure, such that an actual moment-to-moment orientation of the RC drone can mimic a corresponding moment-to-moment positioning of the hand-held structure of the RC controller.

8. The RC drone of claim 7 wherein the RF communications between the RC drone and the RC controller selectively include data transmissions in addition to the control commands, wherein the data transmissions are selectively configured to include video images from a camera onboard the RC drone, and wherein software updates are configured to be received by the hand-held controller from an Internet connection.

9. The RC drone of claim 7 further comprising instructions configured to keep the RC drone within a programmed maximum distance from the RC controller based on the RF communications and to cause the RC drone to automatically reverse when the RC drone approaches the programmed maximum distance from the RC controller.

10. The RC drone of claim 7 wherein the sensor system includes a first set of sensors and a second set of sensors, and wherein the control system is configured to determine a passively measured orientation of the RC drone relative to the inertial gravitational reference that is initially measured and periodically updated using the first set of sensors, and an actively updated orientation of the RC drone between the actively updated orientation, and to use the passively measured orientation and the actively updated orientation as part of determining an actual orientation of the RC drone.

11. The RC drone of claim 7 wherein the sensor system includes both a three-dimensional accelerometer sensor system and a three-dimensional gyroscopic sensor system.

12. The RC drone of claim 7 wherein the two pairs of motors are symmetrically positioned on an X-Y plane such that one pair of motors is positioned at opposite ends of an X axis, and the other pair of motors is positioned at opposite ends of the Y axis with one of the pairs of motors configured to counter-rotate relative to the other of the pairs of motors, wherein the flying structure weighs less than 42 ounces.

13. A control system for a hand-held controller configured to control a radio controlled (RC) drone remote from the hand-held controller, wherein the RC drone is a multi-rotor flying craft having four electrically powered motors, each motor driving at least one blade configured to provide aerodynamic lift for the multi-rotor flying craft, a battery system operably coupled to the motors, and a control system configured to automatically control a downwardly directed thrust produced by each motor in response to control commands communicated by radio communications, the control system comprising:

software that is adapted to be used by a battery-powered microprocessor system in the hand-held controller and that is configured to control the RC drone by radio communications that include control commands corresponding to a desired orientation of the RC drone based on a sensor system in the hand-held controller that is configured to sense a gravitational reference and a relative tilt of the hand-held controller with respect to the gravitational reference as a result of the user selectively orienting the hand-held controller, wherein the RC drone is configured to be remotely controlled from the controller so as to position the RC drone in the desired orientation based on the control system of the RC drone determining a gravitation reference for the RC drone and a sensed orientation of the RC drone and controlling a speed of each of the motors to position the RC drone in response to the control commands in the radio communications corresponding to the desired orientation.

14. The control system of claim 13 wherein radio communications between the RC drone and the hand-held controller are configured to include data transmissions in addition to the control commands, and software updates are configured to be received by the hand-held controller from an Internet connection.

15. A radio controlled (RC) system for a user to remotely control a flying craft with a hand-held controller, the hand-held controller housing a battery-powered microprocessor system and a sensor system, the RC system comprising:

a flying craft having a structure that weighs less than 42 ounces and includes:

four electrically-powered motors arranged as two pairs of motors, one of the pairs of motors configured to counter-rotate relative to the other of the pairs of motors, each motor having at least one blade driven by the motor configured to generate aerodynamic lift for the flying craft;

a control system operably connected to the motors and configured to control a downwardly directed thrust produced by each motor in order to position the flying craft in a desired orientation, the control system including a three dimensional sensor system that includes at least a three-dimensional accelerometer sensor and a three-dimensional gyroscopic sensor and associated control circuitry configured to determine an inertial gravitational reference for use by the control system in controlling a speed of each of the motors;

a radio frequency (RF) transceiver operably connected to the control system and configured to provide RF communications with the hand-held controller that include control commands and data transmissions, wherein the data transmissions are selectively configured to include software updates for the control system received by the hand-held controller from an Internet connection and video images from a camera onboard the flying craft; and a battery system electrically coupled to the motors, the RF transceiver and the control system; and software instructions that are adapted to be used by the battery-powered microprocessor system in the hand-held controller and that are configured to control the flying craft by RF communications that include control commands corresponding to the desired orientation of the flying craft based on the sensor system in the hand-held controller that is configured to sense a controller gravitational reference and a relative tilt of the hand-held controller with respect to the controller gravitational reference as a result of the user selectively orienting the hand-held controller, such that an actual moment-to-moment orientation of the flying craft is capable of mimicking a corresponding moment-to-moment positioning of the hand-held controller.

16. The RC system of claim 15 further comprising instructions configured to keep the flying structure within a programmed maximum distance from the hand-held controller based on the RF communications.

17. The RC system of claim 15 wherein the sensor system includes both a first set of sensors and a second set of sensors, and wherein the control system is configured to determine a passively measured orientation of the flying craft relative to the inertial gravitational reference that is initially measured and periodically updated using the first set of sensors, and an actively updated orientation of the flying craft relative to the inertial gravitational reference using the second set of sensors, and to use a difference between the passively measured orientation and the actively updated orientation to improve determination of an actual craft orientation relative to the inertial gravitational reference.

* * * * *

EX PARTE REEXAMINATION CERTIFICATE (11881st)
United States Patent
Pedersen et al.

(10) Number: US 9,645,580 C1
(45) Certificate Issued: Jul. 23, 2021

(54) RADIO-CONTROLLED FLYING CRAFT

(71) Applicant: QFO Labs, Inc., Bloomington, MN (US)

(72) Inventors: Brad Pedersen, Minneapolis, MN (US); Peter Spirov, Saint Joseph, MI (US)

(73) Assignee: QFO LABS, INC., Bloomington, MN (US)

Reexamination Request:
No. 90/014,439, Jan. 21, 2020

Reexamination Certificate for:
Patent No.: 9,645,580
Issued: May 9, 2017
Appl. No.: 15/272,414
Filed: Sep. 21, 2016

Related U.S. Application Data

(60) Division of application No. 14/791,253, filed on Jul. 3, 2015, now Pat. No. 9,904,292, which is a division of application No. 13/092,940, filed on Apr. 23, 2011, now Pat. No. 9,073,532, which is a continuation of application No. 11/838,040, filed on Aug. 13, 2007, now Pat. No. 7,931,239, which is a division of application No. 10/526,153, filed as application No. PCT/US03/27415 on Sep. 2, 2003, now abandoned.

(60) Provisional application No. 60/407,444, filed on Aug. 30, 2002.

(51) Int. Cl.
| | | |
|---|---|---|
| *G05D 1/08* | (2006.01) | |
| *B64C 27/08* | (2006.01) | |
| *B64C 39/02* | (2006.01) | |
| *B64C 27/20* | (2006.01) | |
| *B64C 15/02* | (2006.01) | |
| *B64D 27/24* | (2006.01) | |
| *B60V 1/06* | (2006.01) | |
| *B60V 1/10* | (2006.01) | |
| *B64C 39/00* | (2006.01) | |
| *G05D 1/00* | (2006.01) | |

(52) U.S. Cl.
CPC ............ *G05D 1/0816* (2013.01); *B60V 1/06* (2013.01); *B60V 1/10* (2013.01); *B64C 15/02* (2013.01); *B64C 27/08* (2013.01); *B64C 27/20* (2013.01); *B64C 39/001* (2013.01); *B64C 39/024* (2013.01); *B64D 27/24* (2013.01); *G05D 1/0016* (2013.01); *G05D 1/0022* (2013.01); *G05D 1/0858* (2013.01); *B64C 2201/042* (2013.01); *B64C 2201/10* (2013.01); *B64C 2201/108* (2013.01); *B64C 2201/146* (2013.01)

(58) Field of Classification Search
None
See application file for complete search history.

(56) References Cited

To view the complete listing of prior art documents cited during the proceeding for Reexamination Control Number 90/014,439, please refer to the USPTO's public Patent Application Information Retrieval (PAIR) system under the Display References tab.

*Primary Examiner* — Peter C English

(57) ABSTRACT

A homeostatic flying hovercraft preferably utilizes at least two pairs of counter-rotating ducted fans to generate lift like a hovercraft and utilizes a homeostatic hover control system to create a flying craft that is easily controlled. The homeostatic hover control system provides true homeostasis of the craft with a true fly-by-wire flight control and control-by-wire system control.

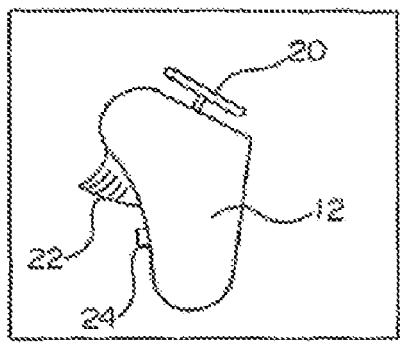
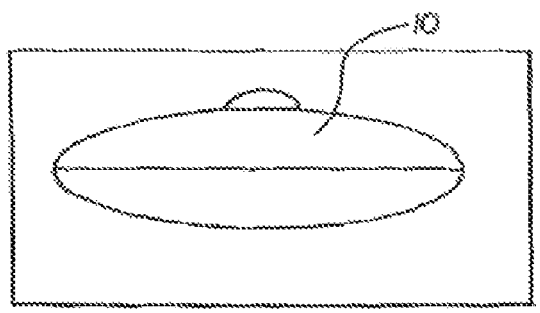

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-17 are now disclaimed.

* * * * *